United States Patent [19]
Yamana et al.

[11] Patent Number: 5,235,375
[45] Date of Patent: Aug. 10, 1993

[54] FOCUSING POSITION DETECTING AND AUTOMATIC FOCUSING APPARATUS WITH OPTIMAL FOCUSING POSITION CALCULATION METHOD

[75] Inventors: Motokazu Yamana; Nobuyuki Nagasawa; Yasuteru Takahama, all of Hachioji, Japan

[73] Assignee: Olympus Optical Co., Ltd., Tokyo, Japan

[21] Appl. No.: 973,561

[22] Filed: Nov. 9, 1992

Related U.S. Application Data

[63] Continuation of Ser. No. 683,591, Apr. 10, 1991.

[30] Foreign Application Priority Data

Apr. 12, 1990 [JP] Japan .................................. 2-97233
Apr. 12, 1990 [JP] Japan .................................. 2-97234
Apr. 27, 1990 [JP] Japan .................................. 2-110638

[51] Int. Cl.⁵ .................................... G03B 13/36
[52] U.S. Cl. ................................... 354/400; 354/402; 250/201.1
[58] Field of Search ............... 250/201; 354/400, 402, 354/404, 405, 406, 407, 408

[56] References Cited

U.S. PATENT DOCUMENTS

| | | | |
|---|---|---|---|
| 4,012,634 | 3/1977 | Bouton et al. ............ | 250/201 |
| 4,389,092 | 6/1983 | Tamura . | |
| 4,470,683 | 9/1984 | Nakajima . | |
| 4,661,692 | 4/1987 | Kawasaki ............ | 250/201 |
| 4,725,720 | 3/1988 | Sawada et al. ............ | 250/201 |
| 4,769,530 | 9/1988 | Miyahara ............ | 250/201 |
| 4,810,869 | 3/1989 | Yabe et al. ............ | 250/201 |
| 4,849,782 | 7/1989 | Koyama et al. . | |
| 4,906,099 | 3/1990 | Casasent . | |

FOREIGN PATENT DOCUMENTS

| | | |
|---|---|---|
| 0378832 | 7/1990 | European Pat. Off. . |
| 55-60903 | 5/1980 | Japan . |
| 61-143710 | 7/1986 | Japan . |
| 61-60413 | 12/1986 | Japan . |
| 62-32761 | 7/1987 | Japan . |
| 63-37363 | 7/1988 | Japan . |

OTHER PUBLICATIONS

Patent Abstracts of Japan, vol. 10, No. 341, Nov. 18, 1986.
Patent Abstracts of Japan, vol. 11, No. 212, Jul. 9, 1987.

*Primary Examiner*—Russell E. Adams
*Attorney, Agent, or Firm*—Frishauf, Holtz, Goodman & Woodward

[57] ABSTRACT

A driving section relatively drives an optical system and an object in a direction of an optical axis of the optical system. An information detecting section detects information of the object obtained by the optical system. A focusing position detecting section detects evaluation values representing in-focus states of a plurality of positions in a focusing position and positions near the focusing position, in response to a plurality of focusing position calculation methods different from each other, based on the information of said object respectively. An initializing section initializes an optimal focusing position calculation method, of the plurality of focusing position calculation methods, which is most suitable for a focusing operation of the object.

5 Claims, 22 Drawing Sheets

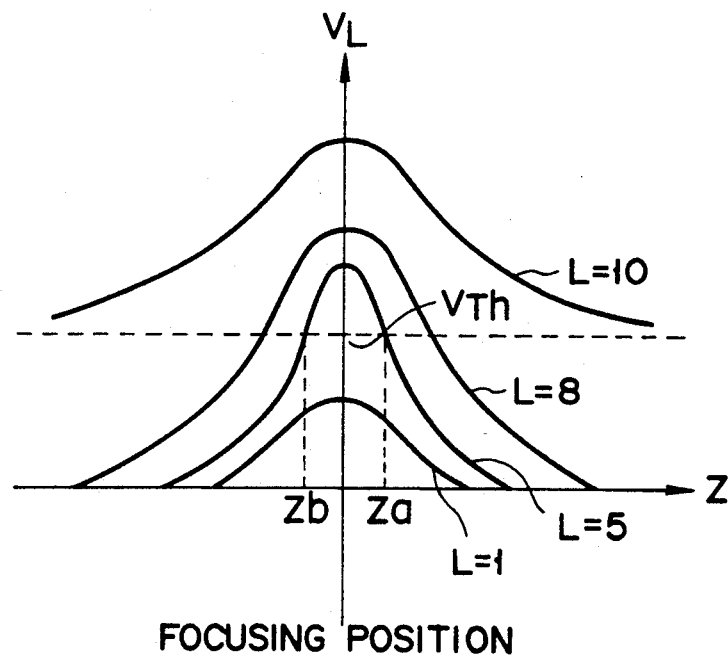
F I G. 4
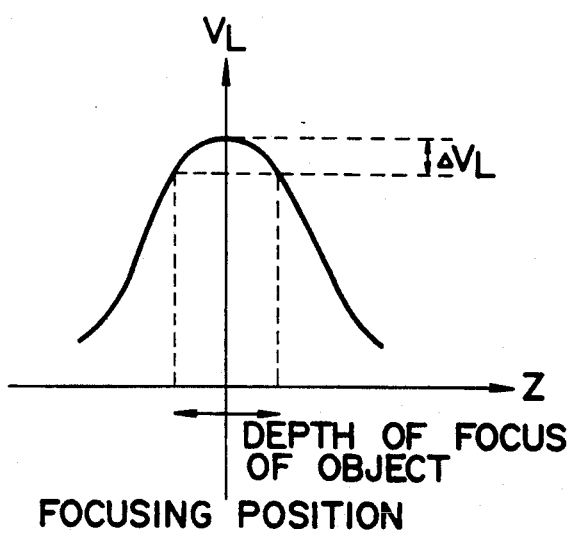
F I G. 5

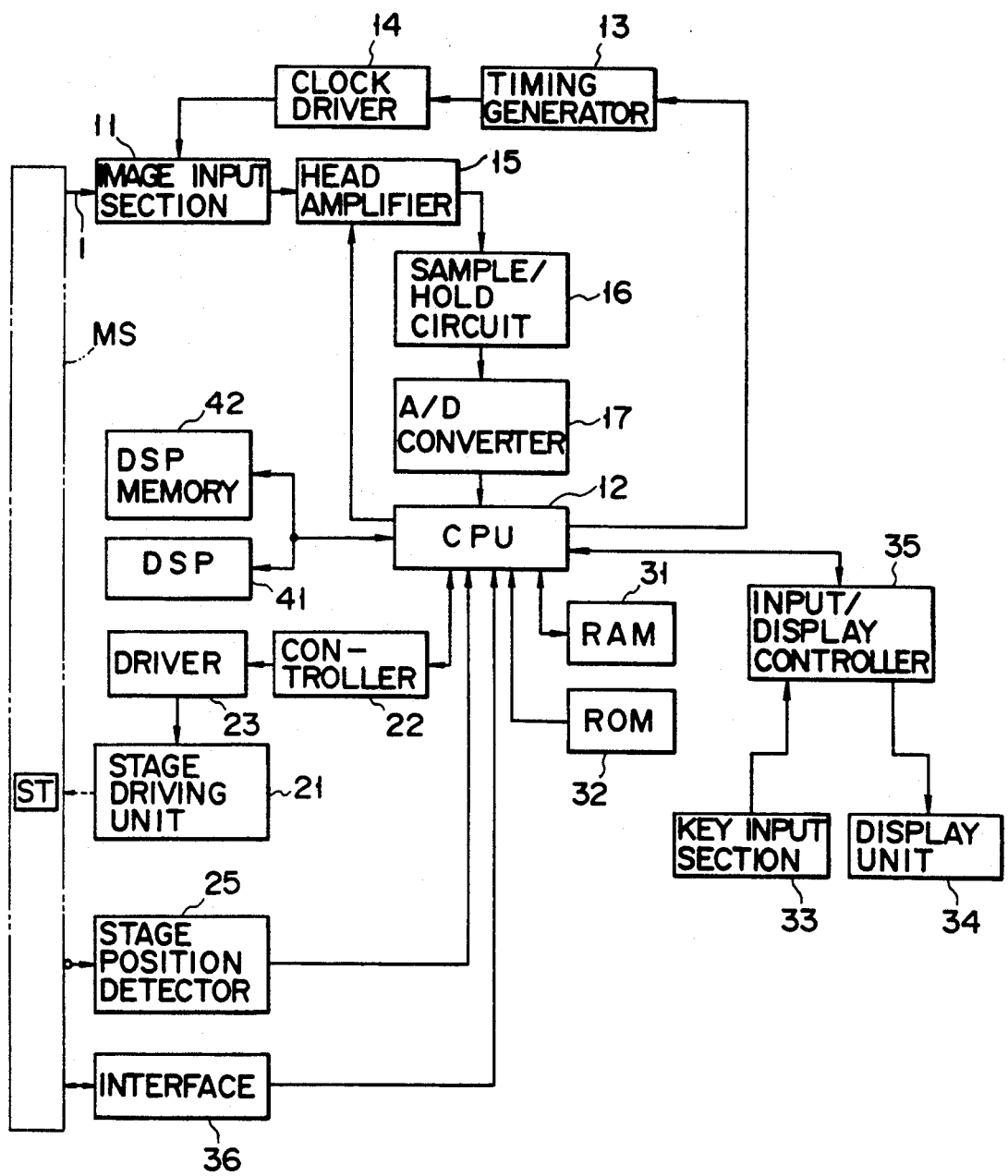
F I G. 6

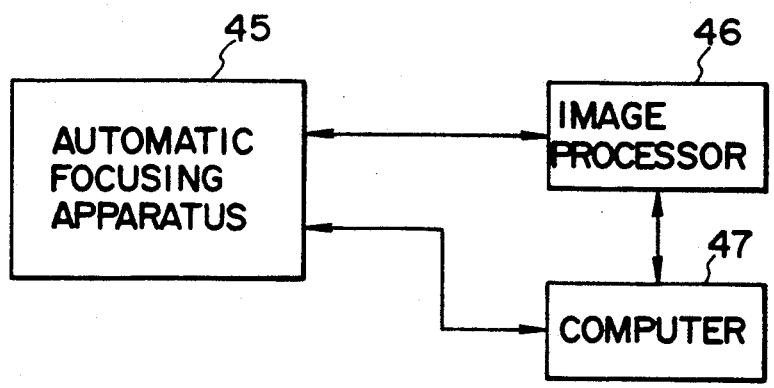
F I G. 9
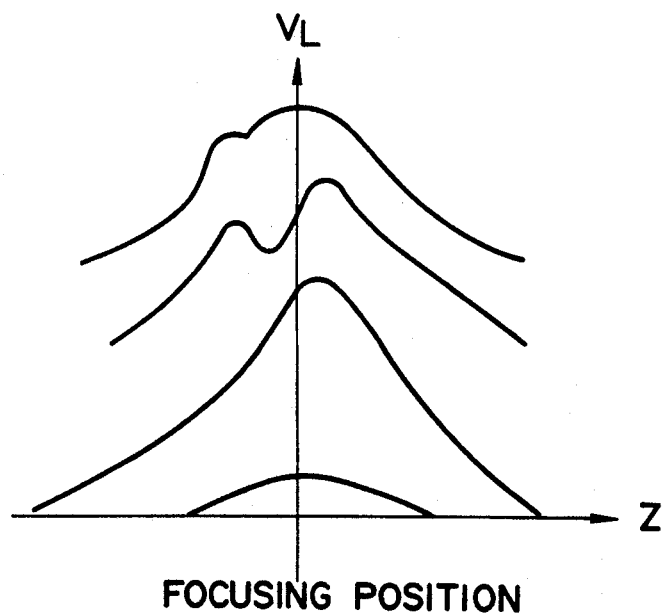
FOCUSING POSITION
F I G. 10

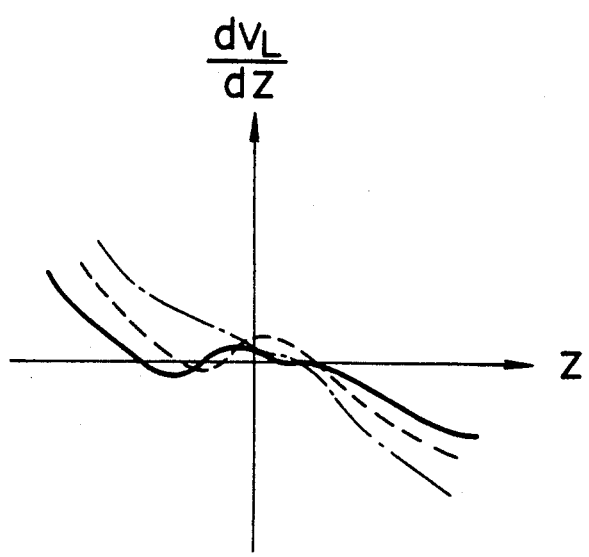
F I G. 11

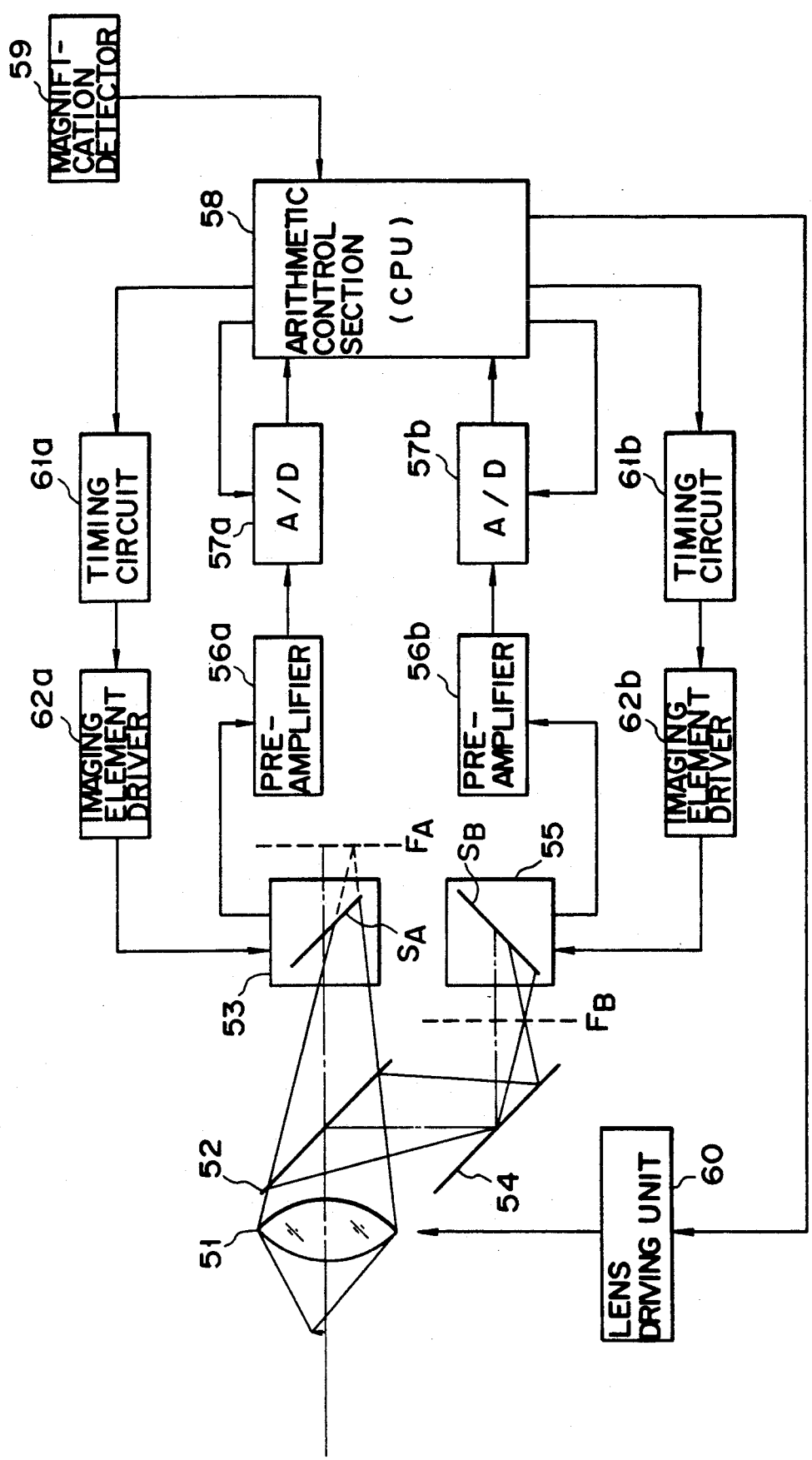
F I G. 13

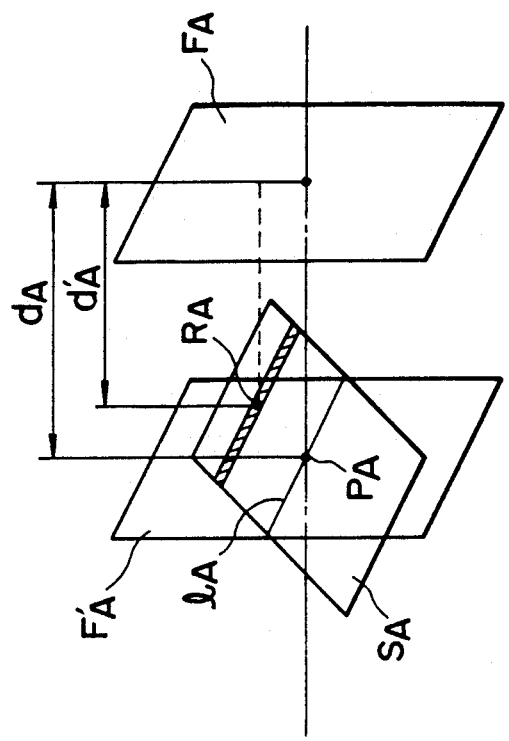
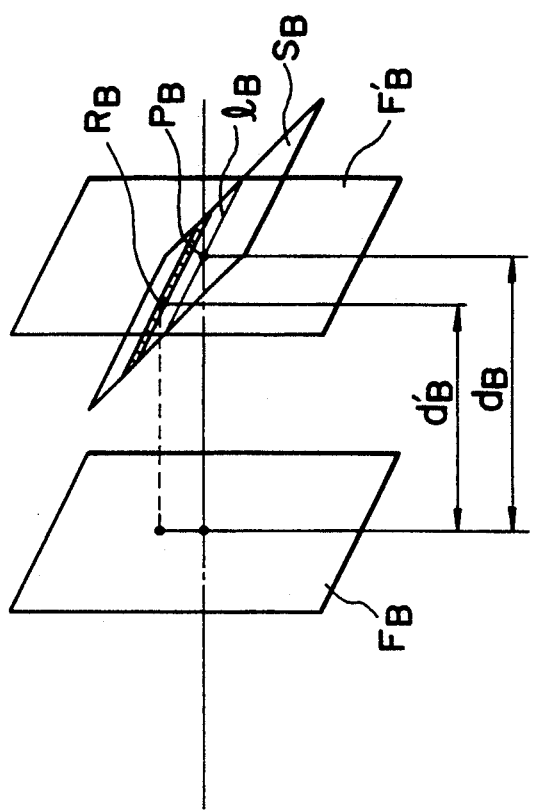
FIG. 14A
FIG. 14B

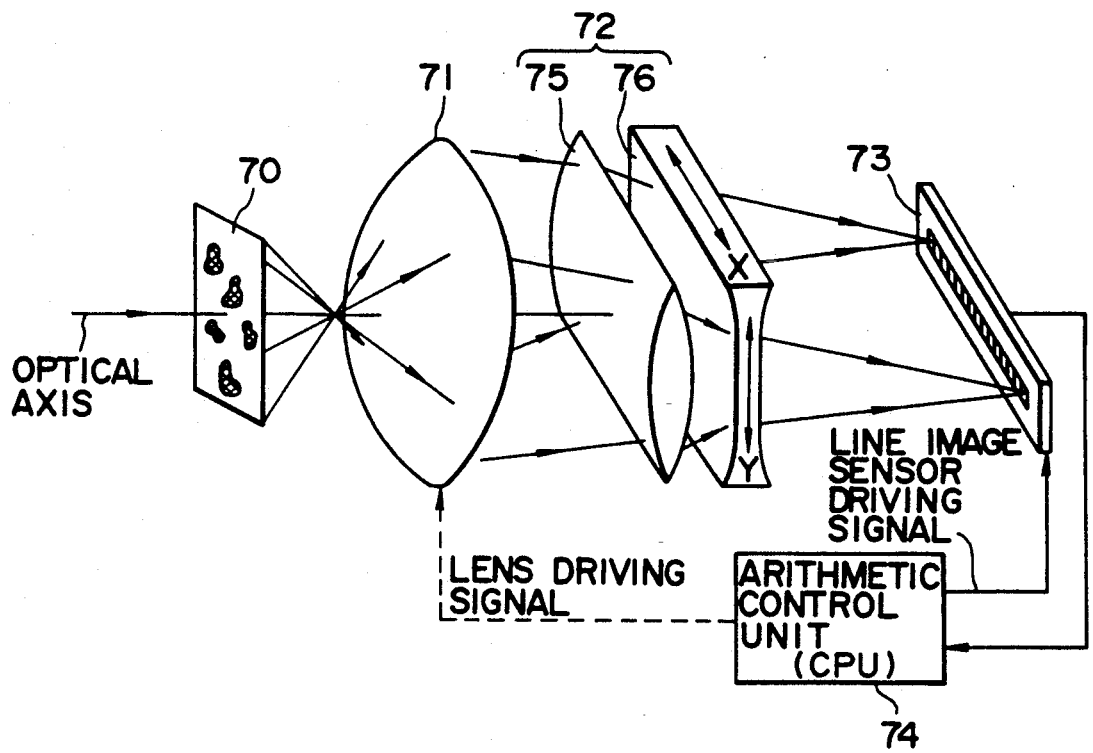
F I G. 17
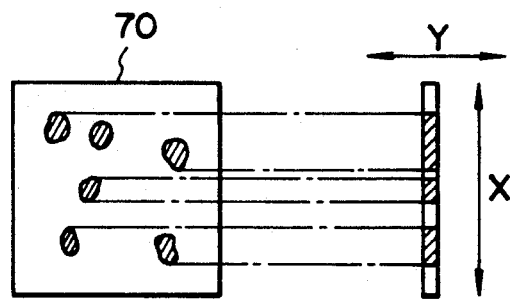
F I G. 18

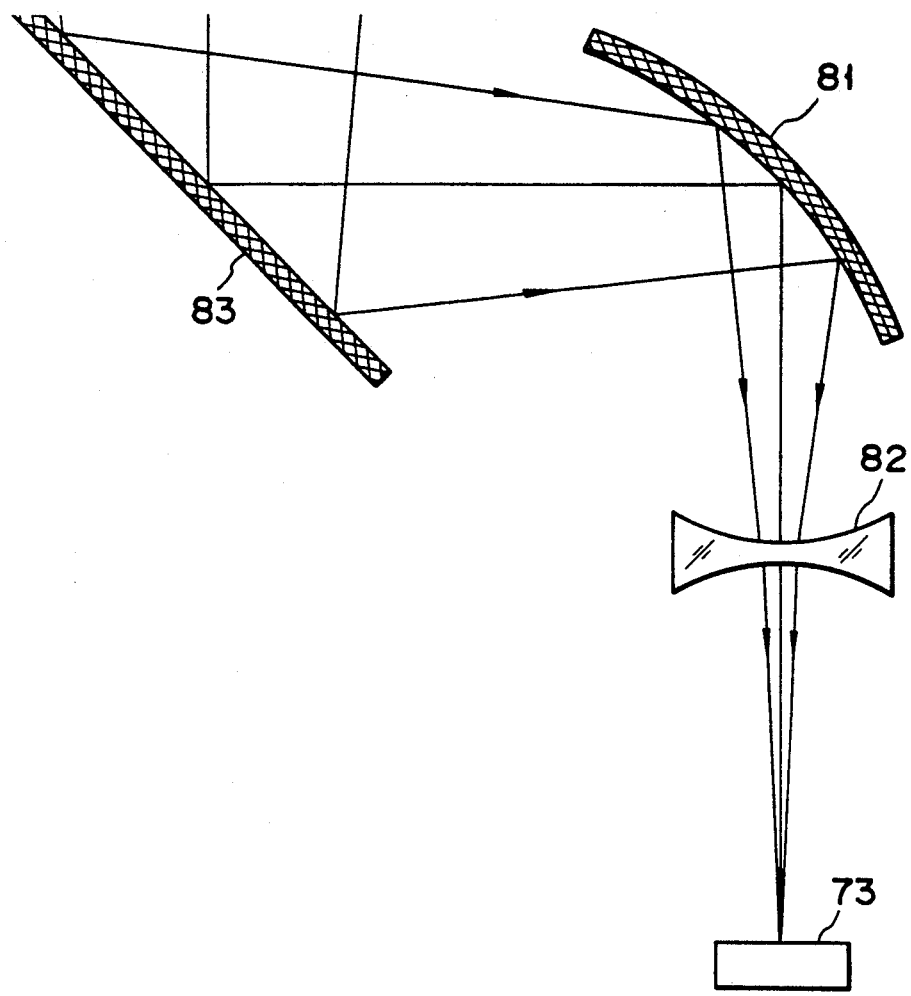
F I G. 19

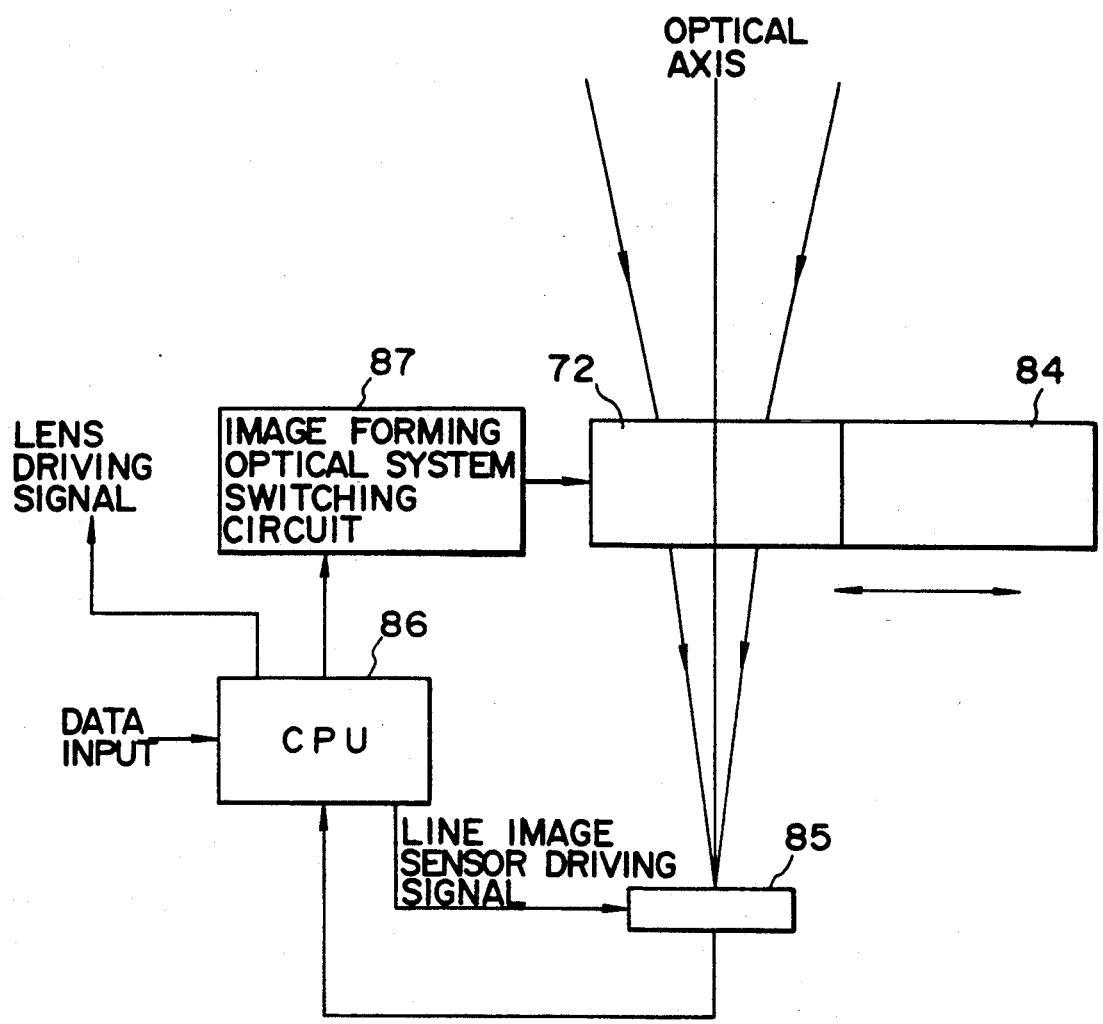
F I G. 20
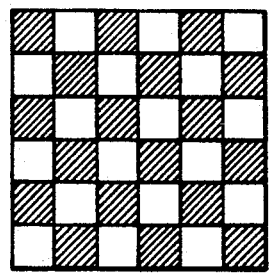
F I G. 21

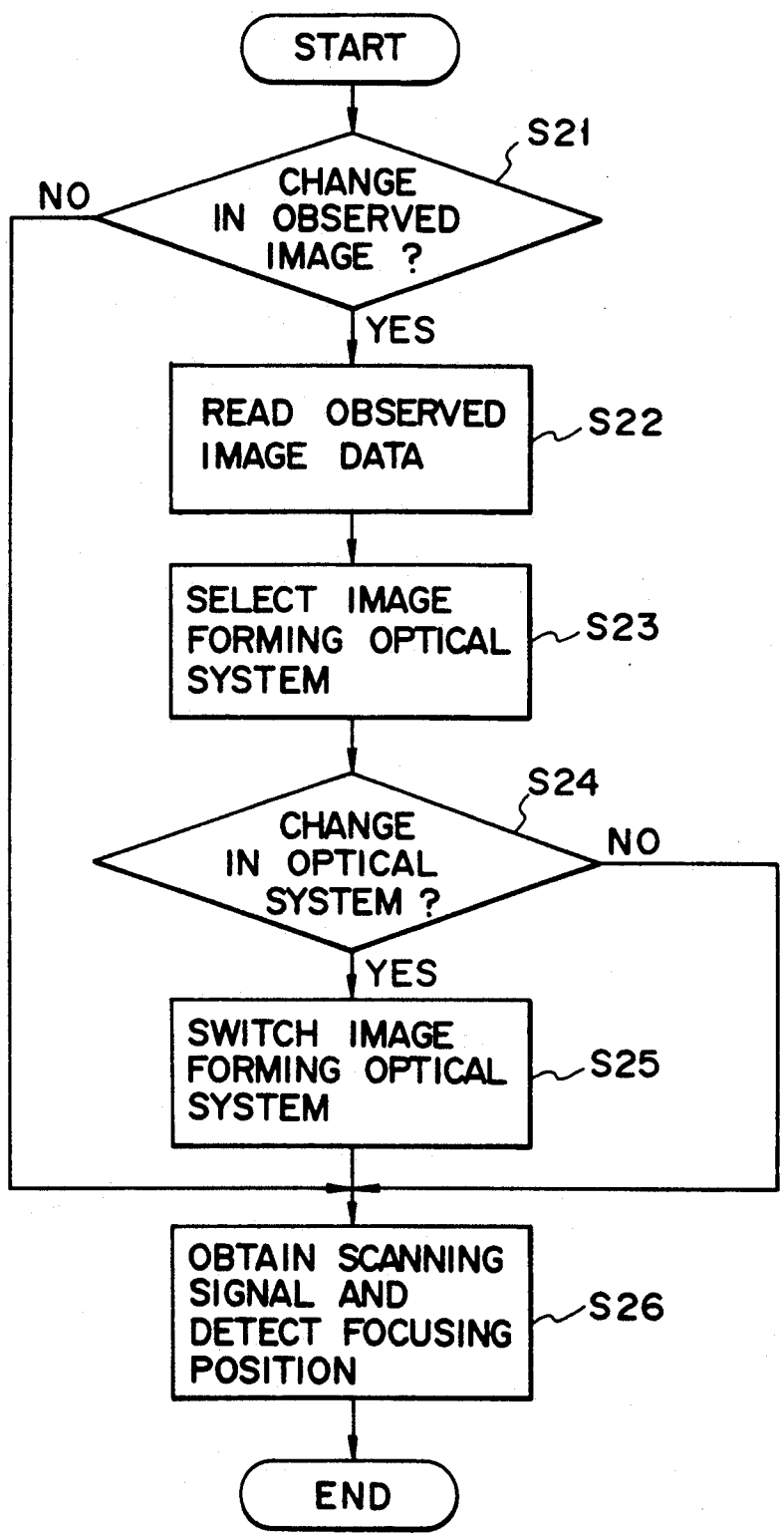
F I G. 22

FOCUSING POSITION DETECTING AND AUTOMATIC FOCUSING APPARATUS WITH OPTIMAL FOCUSING POSITION CALCULATION METHOD

This application is a continuation of application Ser. No. 07/683,591, filed Apr. 10, 1991.

BACKGROUND OF THE INVENTION

1. Field of the Invention

The present invention relates to a focusing position detecting and automatic focusing apparatus and, more particularly, to a focusing position detecting apparatus used for focus adjustment of an optical device such as a camera or a microscope, a focusing position detecting apparatus for receiving sample image light from a microscope or the like by means of an image sensor and detecting a focusing position on the basis of a resulting scanning signal, and an automatic focusing apparatus for an optical device, e.g., a microscope, which can be used in combination with these focusing position detecting apparatuses.

2. Description of the Related Art

As a conventional automatic focusing apparatus for a microscope or the like, an apparatus disclosed in, e.g., Published Unexamined Japanese Patent Application No. 61-143710 is known. In this automatic focusing apparatus, a focusing position calculation method is basically fixed to only one kind of focusing position calculation method. In this automatic focusing apparatus, initialization is performed in accordance with the flow chart shown in FIG. 23. Firstly, a focusing operation is performed while the focusing position calculation method for normally used samples is fixed, thus positioning an objective optical system and a target object to set a proper distance therebetween by an automatic focusing function (step S1). In step S2, it is checked whether the focusing position of the positioned target object is optimal. If it is not the optimal focusing position for a user, offset adjustment is performed with respect to the focusing position set by the automatic focusing function (step S3). With this operation, the focusing position set by the automatic focusing function is optimized, thus completing the initialization (step S4).

Another conventional automatic focusing apparatus is disclosed in Published Examined Japanese Patent Application No. 62-32761. In this apparatus, a high-frequency component is extracted from the spatial frequency components of a target object image formed by a phase contrast optical system. Subsequently, a focusing position is obtained on the basis of the relative distance between the phase contrast optical system and the target object at which the high-frequency component of the spatial frequency components exhibits the maximum value when the high-frequency component has the second peak within a predetermined distance range from this relative distance.

In the automatic focusing apparatus disclosed in Published Unexamined Japanese Patent Application No. 61-143710, however, since a focusing position calculation method applicable for normally used samples is fixed, a focusing position set by this method becomes unstable, if, for example, a special sample is to be focused. Therefore, a focusing operation with high reproducibility cannot be expected.

Furthermore, in the automatic focusing apparatus disclosed in Published Examined Japanese Patent Application No. 62-32761, since a focusing position is solely determined on the basis of the relative distance between the optical system and the target object a which the high-frequency component of the spatial frequency components exhibits the maximum value, it cannot reflect a subtle difference in optimal focusing position between users.

As a conventional focusing position detecting optical system, an optical system having the arrangement shown in FIG. 24A is known. Light-receiving element arrays $S_A$ and $S_B$ are arranged before and behind a focal plane F, of an optical system L for forming an object image, in the direction of the optical axis of the optical system L, at the same distance from the focal plane F while the respective element arrays are perpendicular to the optical axis. Output signals from these light-receiving element arrays $S_A$ and $S_B$ are converted into evaluation values by predetermined evaluation functions, and a focusing position is detected on the basis of the evaluation values.

FIGS. 24B and 24C respectively show relationships between evaluation values and image forming positions at different magnifications. As shown in FIGS. 24B and 24C, a focusing position is the position where a difference $\Delta V$ between an evaluation value $V_A$ of an output signal from the light-receiving element array $S_A$ and an evaluation value $V_B$ of an output signal from the light-receiving element array $S_B$ becomes 0. In the conventional apparatus, therefore, a focusing state is detected on the basis of the comparison between the evaluation values $V_A$ and $V_B$ in the following manner. If $V_A > V_B$, a forward-focus state is detected. If $V_A < V_B$, a backward-focus state is detected. If $V_A = V_B$, an in-focus e.g., just focusing state is detected.

In the above-described focus detection, however, since the N.A. on the image side is greatly changed when the magnification of the optical system L is changed, the difference $\Delta V$ between the evaluation values $V_A$ and $V_B$ corresponding to the light-receiving element arrays $S_A$ and $S_B$ is decreased depending on the magnification of the optical system L. For this reason, it is sometimes difficult to determine a near-focus state or a far-focus state. Furthermore, an evaluation value $V_F$ at the focal plane F may be reduced to make determination of an in-focus state difficult.

If, for example, the distances between the focal plane F and the pair of light-receiving element arrays $S_A$ and $S_B$ are set in accordance with a low magnification of an optical system as shown in FIG. 24C, when the magnification of the optical system is increased, the N.A. on the image side is greatly increased as compared with the case of the low magnification, thus increasing the depth of focus on the image side, as shown in FIG. 24B. As a result, the difference $\Delta V$ between the evaluation values $V_A$ and $V_B$ is reduced to make determination of a defocus direction difficult.

In contrast to this, assume that the distances between the focal plane F and the light-receiving element arrays $S_A$ and $S_B$ are set in accordance with a high magnification of the optical system. In this case, when the magnification of the optical system is changed to a low magnification, the N.A. on the image side is increased as compared with the case of a high magnification, thus decreasing the depth of focus on the image side. As a result, the evaluation value at the focal plane F becomes a small value. Moreover, a region (dead zone) where $\Delta V = 0$ continuously appears is generated near the focal plane F. For these reasons, determination of an in-focus state cannot be performed.

In a conventional apparatus, therefore, distances lA and lB between the focal plane F and the light-receiving element arrays $S_A$ and $S_B$ are changed within a range of $\Delta l$ in accordance with switching of magnifications of the optical system L, as shown in FIG. 25A. More specifically, if the distances between the focal plane F and the light-receiving element arrays $S_A$ and $S_B$ are set to be $lA_1$ and $lB_1$ when the magnification of the optical system is low, as shown in FIG. 25B, the evaluation values $V_A$ and $V_B$ calculated from output signals from the light-receiving element arrays $S_A$ and $S_B$ exhibit a dead zone, in which $\Delta V = 0$ continuously appears, near the focal plane F, as shown in FIG. 25C. For this reason, the distances between the focal plane F and the light-receiving elements $S_A$ and $S_B$ are changed by $\Delta l$ to be $lA_2$ and $lB_2$. With this operation, the evaluation values $V_A$ and $V_B$ shown in FIG. 25D are obtained, and hence the difference $\Delta V$ is increased to a value large enough to detect a focusing position.

In the technique shown in FIGS. 25A to 25D, however, since the optical path lengths between the focal plane F and the light-receiving element arrays $S_A$ and $S_B$ are changed, driving units for moving the light-receiving element arrays $S_A$ and $S_B$ along the optical axis are required, and the optical path lengths must be adjusted to optimal optical path lengths in accordance with the magnification of the optical system. Therefore, the apparatus requires complicated control and arrangement.

In addition, video information obtained by the light-receiving element arrays at a specific magnification of the optical system is limited to that having a specific difference in optical path length. This deteriorates the focusing precision of the apparatus.

According to another conventional focusing position detecting apparatus, a line image sensor is arranged near the focal plane of an image forming optical system. In this apparatus, a scanning signal of an image projected on the line image sensor is input to an arithmetic unit, and an optical lens system is controlled by executing an arithmetic operation on the basis of image information, such as the contrast of the image, included in the scanning signal obtained by line scanning, thereby obtaining an optimal focusing result.

Samples as observed images, however, vary widely in shape and distribution. For example, as shown in FIG. 26, the components of a sample 91 may be scattered in an image, so that a pixel array of the line image sensor (scanning line) cannot cover the image of the sample 91. In such a case, since a scanning signal output from the line image sensor includes no image information of the sample on which the optical system is to be focused, a focusing position cannot be detected.

In order to solve such a problem, the following technique has been proposed. The image surface of an image (to be read by the line image sensor) formed by the image forming optical system is scanned from a read start position to a read end position to read the image. The read image is then converted into a new image. Thereafter, the line image sensor is moved from the read end position to the read start position. In the process of this movement, the line image sensor is stopped at a position where image information is present. By using a scanning signal at this time, a focusing position is detected. This technique is disclosed in, e.g., Published Examined Japanese Patent Application No. 63-37363.

The focusing position detecting apparatus in the above publication has the arrangement shown in FIG. 27. A line image sensor 93 is moved to a movement start position by a line image sensor moving unit 95 in response to a command from an arithmetic control unit (CPU) 94. Under the control of the CPU 94, the line image sensor 93 is driven by a line image sensor driver 96, and a scanning signal output from the line image sensor 93 is input to a line image sensor output processor 97 to be converted into a digital signal. The digital signal is then fetched by the CPU 94. The CPU 94 performs arithmetic processing for the scanning signal data to determine the presence/absence of information required for a focusing position detection operation. The above-described operation is repeated until information required for a focusing position detecting operation is obtained, i.e., until the scanning line is located at a position where a sample is present. In the apparatus shown in FIG. 27, the line image sensor 93 is moved to the optimal position for a focusing position detecting operation, and a scanning signal of an image is fetched by the CPU 94 in this manner to control an optical lens system (not shown), thereby detecting a focusing position.

In the focusing position detecting apparatus shown in FIG. 27, however, since the line image sensor moving unit 95 is required to move the line image sensor 93, the apparatus is undesirably increased in size.

Furthermore, in the apparatus shown in FIG. 27, since arithmetic processing of linear image information must be repeatedly performed by moving the line image sensor 93, it takes much time to detect a focusing position.

SUMMARY OF THE INVENTION

It is, therefore, an object of the present invention to provide a new and improved automatic focusing apparatus which has a proper arrangement to always allow stable, high-precision positioning with respect to a optimal focusing position intended by a user with excellent reproducibility.

According to the present invention, there is provided an automatic focusing apparatus comprising: driving means for relatively driving an optical system and an object in a direction of an optical axis of the optical system; information detecting mean for detecting information of the object obtained by the optical system; focusing position detecting means for detecting evaluation values representing in-focus states of a plurality of positions in a focusing position and positions near the focusing position, in response to a plurality of focusing position calculation methods different from each other, based on the information of the object from the information detecting means, respectively; and initializing means for initializing an optimal focusing position calculation method, of the plurality of focusing position calculation methods, which is most suitable for a focusing operation of the object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 4 and 5 are graphs for explaining an operation of the apparatus in FIG. 3;

FIG. 6 is a block diagram showing another practical example of the automatic focusing apparatus according to the first embodiment of the present invention;

FIG. 9 is a block diagram showing still another practical example of the automatic focusing apparatus according to the first embodiment of the present invention;

FIGS. 10 and 11 are graphs for explaining different applications of the first embodiment of the present invention;

FIG. 13 is a block diagram showing a practical example of the focusing position detecting apparatus according to the second embodiment of the present invention;

FIGS. 14A and 14B are views showing an arrangement of two-dimensional CCD arrays used for the apparatus in FIG. 13;

FIG. 17 is a view showing a detailed arrangement of a focusing position detecting apparatus according to the third embodiment of the present invention;

FIG. 18 is a view showing a plan view of a sample image and its compressed image., FIG. 19 is a view showing a modification of a compressed image forming optical system used for the apparatus in FIG. 17;

FIG. 20 is a block diagram showing an arrangement of part of another practical example of the third embodiment of the present invention;

FIG. 21 is a plan view of a sample image used for the apparatus in FIG. 20 and having contrast expressed by a pattern;

FIG. 22 is a flow chart for explaining an operation of the apparatus in FIG. 20

DETAILED DESCRIPTION OF THE PREFERRED EMBODIMENTS

Figure 1:
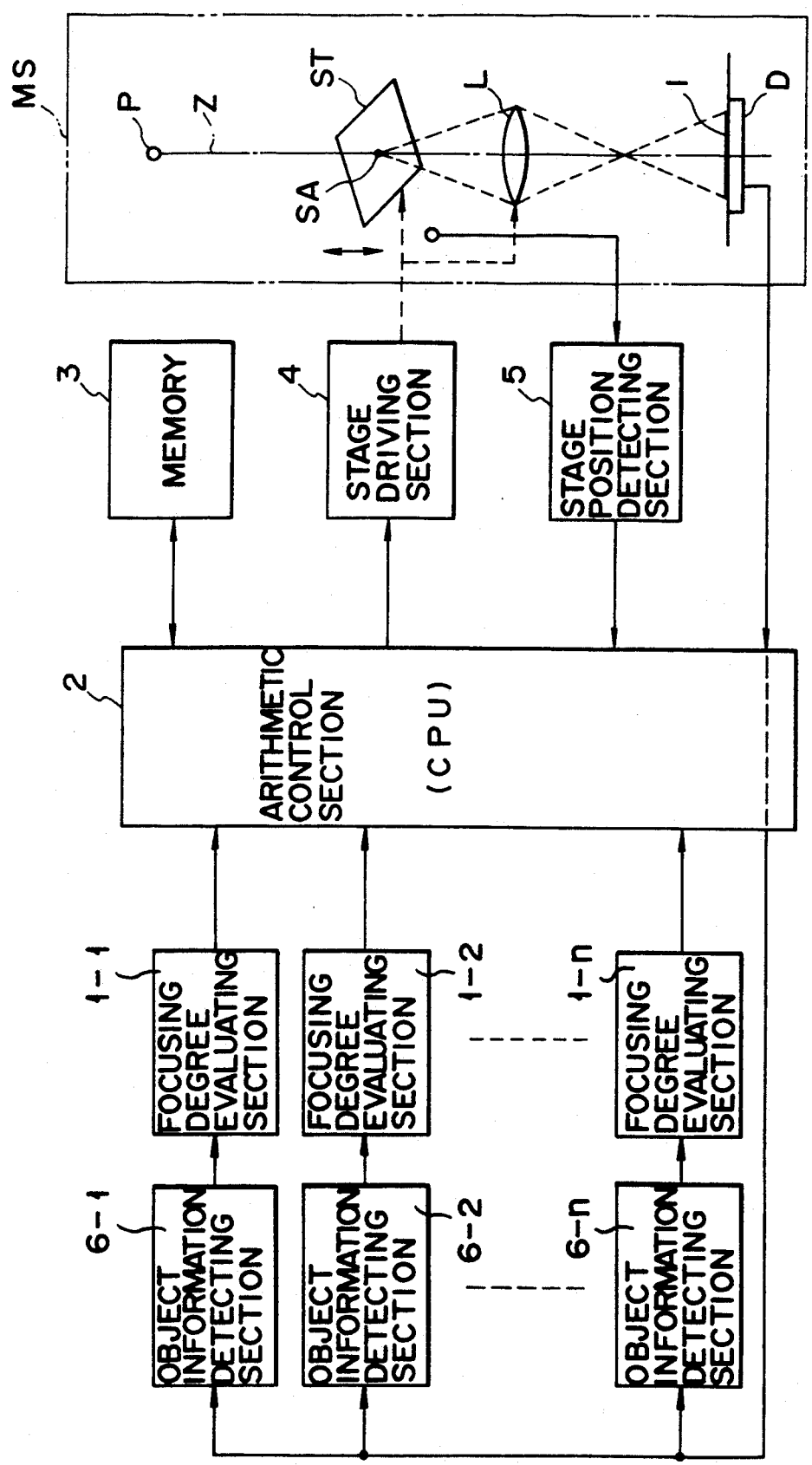
FIG. 1 is a block diagram showing a schematic arrangement of an automatic focusing apparatus according to the first embodiment of the present invention.

Reference will now be made in detail to the presently preferred embodiments of the invention as illustrated in the accompanying drawings, in which like reference characters designate like or corresponding parts throughout the several drawings.

An automatic focusing apparatus according to the first embodiment of the present invention will be described with reference to the accompanying drawings.

FIG. 1 shows a schematic arrangement of an automatic focusing apparatus according to the first embodiment of the present invention, which is applied to a general optical microscope MS designed to perform a focusing operation by moving a stage ST in the direction of the optical axis Z direction of an objective optical system L. This automatic focusing apparatus comprises a plurality of focusing degree evaluating sections 1-1 to 1-n for respectively calculating focusing degrees by different focusing position calculation methods, a control section (CPU) 2 for controlling operations of the overall automatic focusing apparatus, a memory 3 for storing operation programs and various types of data required for the respective components, a stage driving section 4 for driving the stage ST, on which a sample $S_A$ as an object is mounted, in the Z direction, and a stage position detecting section 5 for detecting the position of the stage ST in the Z direction. Referring to FIG. 1, reference symbol P denotes a light source; I, a microscopic image; and D, an image input section such as a CCD. Reference numerals 6-1 to 6-n denote object information detecting sections for providing information of the object obtained by the optical microscope MS to the focusing degree evaluating section 1-1 to 1-n.

Figure 2:
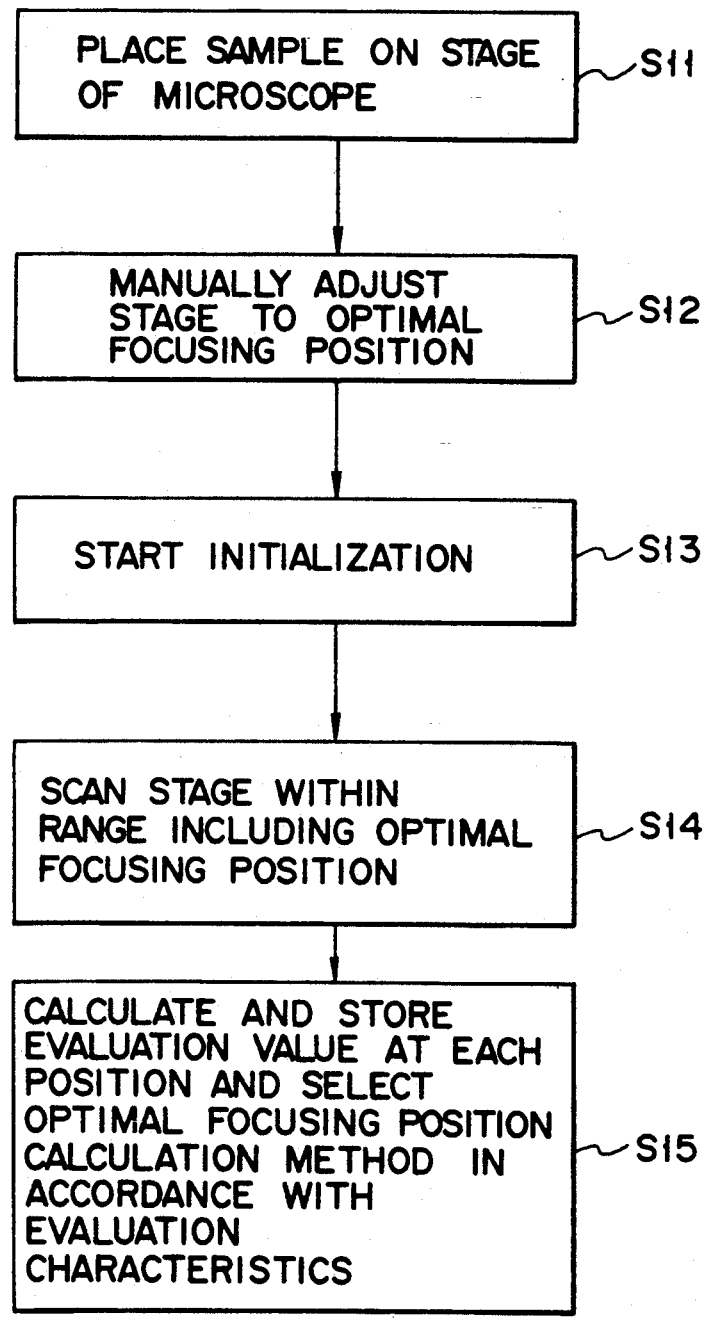
FIG. 2 is a flow chart for explaining an operation of the apparatus in FIG. 1.

As shown in the flow chart shown in FIG. 2, in this apparatus, a user places the sample $S_A$ on the stage ST (step S11), and the stage ST is manually adjusted to an optimal focusing position for the user (step S12). Subsequently, initialization of the automatic focusing apparatus is started (step S13). In this initialization, the stage ST is scanned in the Z direction by the stage driving section 4 within a predetermined range in the Z direction, which includes the optimal focusing position set by the user (step S14). Within this scan range, evaluation values are respectively obtained by the focusing degree evaluating sections 1-1 to 1-n in accordance with position data from the stage position detecting section 5, and the obtained evaluation values are stored in the memory 3 (step S15). When scanning of the stage ST in the Z direction is completed, one of the focusing degree evaluating sections 1-1 to 1-n, which is based on a focusing position calculation method for obtaining an optimal focusing position, is selected on the basis of the evaluation values obtained by the focusing degree evaluating sections 1-1 to 1-n and stored in the memory 3, in accordance with a program stored in the memory 3. Subsequently, when the same type of sample is placed on the stage ST, the stage ST is automatically positioned to an optimal focusing position in relation to the objective optical system L by moving the stage ST in the Z direction on the basis of an evaluation value from a selected one of the focusing degree evaluating sections 1-1 to 1-n.

Note that evaluation values obtained by the focusing degree evaluating sections 1-1 to 1-n at the respective positions in the scan range of the stage ST in the Z direction may be obtained by scanning the stage ST in the Z direction and performing an arithmetic operation based on information of the object from the object information detecting section 6-1 to 6-n, at each position in the scan range, or may be obtained by storing the information at each position in the scan range and performing an arithmetic operation on the basis of the stored information after the scanning operation.

As described above, the plurality of focusing degree evaluating sections 1-1 to 1-n based on the different focusing position calculation methods are arranged. In this arrangement, the stage ST is scanned in the Z direction within the predetermined range including the optimal focusing position to which the stage ST is manually adjusted by the user, thus obtaining evaluation values at the respective positions in the scan range. One of the focusing degree evaluating sections 1-1 to 1-n which is based on the focusing position calculation method for providing an optimal focusing position is selected on the basis of the evaluation values. With this operation, the stage ST can always be positioned stably to an optimal focusing position reflecting the intention of a user with high reproducibility and high precision. In addition, an automatic focusing operation can be performed with respect to an unknown sample by an optimal focusing position calculation method.

In this case, in order to facilitate understanding of the description, the focusing degree evaluating sections are independently arranged. However, focusing degree evaluation processing can be performed in the CPU on the basis of information from the image input section D in accordance with a program of a focusing position calculation method stored in the memory.

Figure 3:
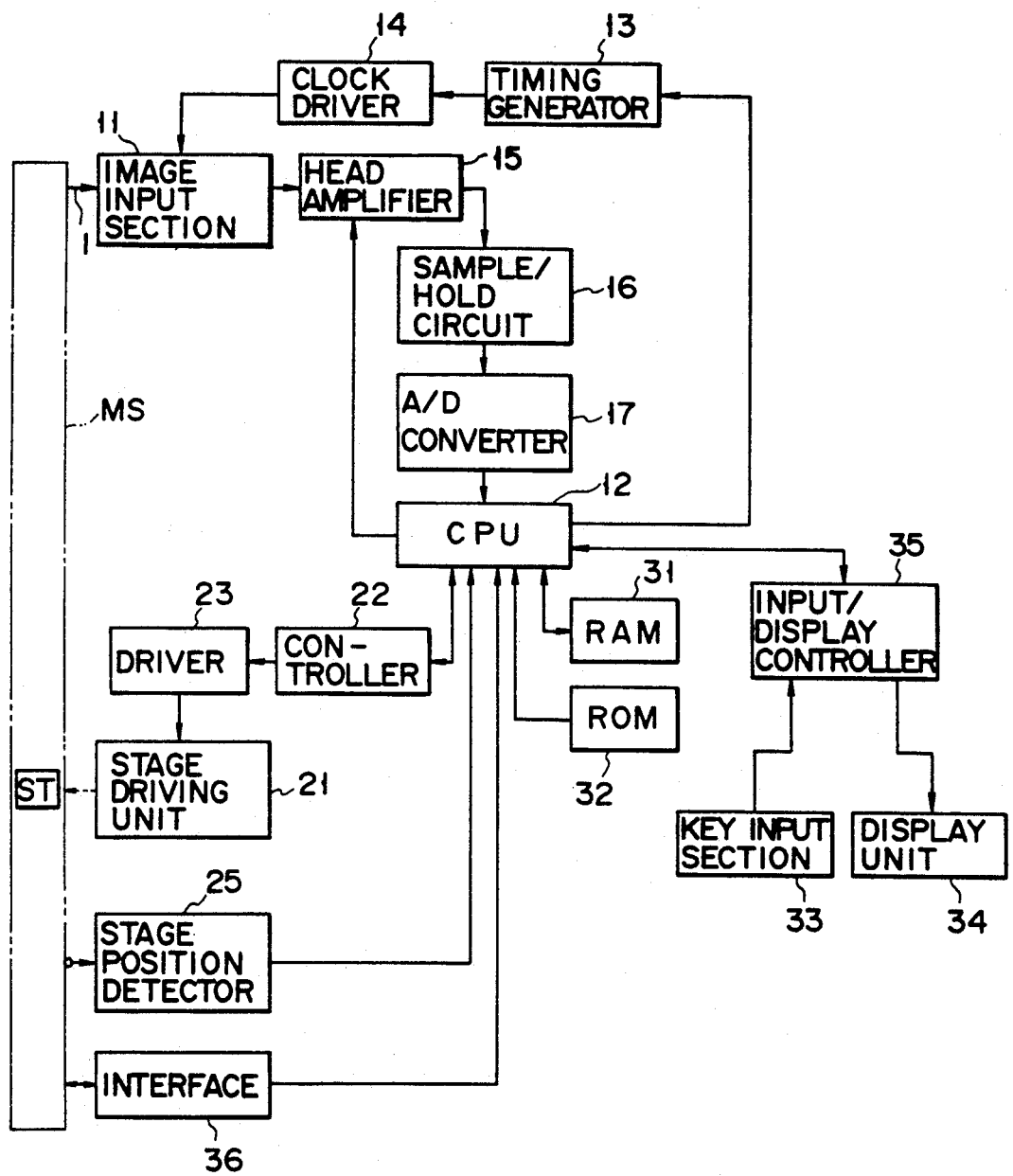
FIG. 3 is a block diagram showing a practical example of the automatic focusing apparatus according to the first embodiment of the present invention.

FIG. 3 is a block diagram showing a detailed arrangement of the first embodiment of the present invention. In this embodiment, the present invention is applied to the general optical microscope MS in FIG. 1. In this arrangement, a microscopic image I formed by the optical microscope MS is input to the apparatus, and a focusing state representing a focusing degree, i.e., a degree of near- or far-focus state, is detected by a known contrast method of evaluating the sharpness of the input image.

The microscopic image I is input to an image input section 11 to be converted into an image signal. The image input section 11 comprises a solid imaging element such as a CCD. The image input section 11 is driven by an arithmetic control section (CPU) 12 through a timing generator 13 and a clock driver 14. The image signal from the image input section 11 is fetched by the CPU 12 through a head amplifier 15, a sample/hold circuit 16, and an analog/digital (A/D) converter 17. Note that a storage time of the microscopic image I in the image input section 11 is controlled by the CPU 12 through the timing generator 13 and the clock driver 14. In addition, the gain of the head amplifier 15 is also controlled by the CPU 12.

In this case, as shown in FIG. 1, the stage ST, on which a sample is mounted, is moved in the direction of the optical axis (Z direction) of the objective optical system L to perform focusing adjustment. For this purpose, a stage driving unit 21 is arranged to drive the stage ST in the Z direction. The stage driving unit 21 is driven by the CPU 12 through a controller 22 and a driver 23. Note that the stage driving unit 21 comprises, e.g., a DC motor or a stepping motor.

In addition, a stage position detector 25 is arranged to detect the position of the stage ST in the Z direction, which is driven by the stage driving unit 21. An output from the detector 25 is supplied to the CPU 12. The stage position detector 25 is comprises e.g., an encoder.

An input/display controller 35 and an interface 36 are connected to the CPU 12. The controller 35 serves to control a RAM 31 for storing data, a ROM 32 for storing programs, a key input section 33, and a display unit 34. The interface 36 serves to access the optical microscope MS for information of the optical system, such as the type and magnification of an objective lens, and to transmit/receive other information to/from the microscope MS.

An operation of the apparatus having the arrangement shown in FIG. 3 will be described below.

Various types of samples are observed by an optical microscope. In practice, however, samples of the same type are very often observed. In this case, therefore, a standard focusing position calculation method used in observation of various types of samples, and a plurality of focusing position calculation methods, each for use in observation of samples of the same type, including the standard focusing position calculation method are stored in the ROM 32. In an observation mode for various types of samples, an automatic focusing operation is performed by the standard focusing position calculation method. In an observation mode for samples of the same type, an automatic focusing operation is performed by selecting an optimal focusing position calculation method for a corresponding sample from the plurality of focusing position calculation methods upon initialization to be described below.

In the observation mode of samples of the same type, a user selects one representative sample from samples to be observed by using the optical microscope MS, and places it on the stage ST. The user then manually adjusts the stage ST to a preferable focusing position and starts initialization by operating the key input section 33.

When initialization is started, the CPU 12 fetches stage position data associated with the focusing position, to which the stage ST is manually adjusted by the user, from the stage position detector 25. At the same time, the CPU 12 accesses the optical microscope MS to fetch objective data, such as the type and the like of a currently used objective lens, through the interface 36. The CPU 12 determines a scan range of the stage ST in the Z direction, which includes the focusing position to which the stage ST is adjusted by the user, on the basis of the fetched data. Subsequently, the CPU 12 determines the gain of the head amplifier 15 and a storage time of the microscopic image I in the image input section 11 on the basis of the image information input to the image input section 11 in the in-focus state currently adjusted by the user. The CPU 12 coarsely scans the stage ST within the scan range through the stage driving unit 21. On the basis of the level of the input image information, the CPU 12 checks whether the gain of the head amplifier 15 and the storage time of the image input section 11 set in this manner are proper. If it is determined that these settings are improper, they are corrected.

Upon completion of the above operation, the CPU 12 determines a step width in a scanning operation on the basis of the objective data from the optical microscope MS. While moving the stage ST in the scan range through the stage driving unit, the CPU 12 fetches image information corresponding to each step width in the scan range. Upon completion of fetching of image information at each step position, the CPU 12 obtains contrast evaluation values on the basis of the image information at the respective step positions by a plurality of different focusing position calculation methods stored in the ROM 32, and stores the contrast evaluation values obtained by the focusing position calculation methods in the RAM 31.

In this case, each contrast evaluation value is obtained by calculating moving averages on the basis of the obtained image information by using the following equations, and calculating a difference between the averages:

$$Y_1[n] = \frac{1}{L} \sum_{k=0}^{L-1} X_1[n - K]$$

$$Y_2[n] = X_2[n] - X_2[n - L]$$

$$V_L = \sum_{\text{all pixels}} |Y_2[n]|$$

For the sake of a simple description, equations of the first degree are used in this case. According to the above equations, L moving averages $Y_1$ of input image information $X_1$ are obtained, the differences of the averages are obtained according to the second equation while $X_2$ is substituted for $Y_1$, and $V_L$ representing the total sum of the absolute values of the differences is finally calculated.

In this case, four types of focusing position calculation methods with L=1, 5, 8, 10 are stored in the ROM 32 as different types of focusing position calculation methods. If contrast evaluation values are obtained by the respective focusing position calculation methods, evaluation value characteristics shown in, e.g., FIG. 4 are obtained.

Subsequently, focusing position calculation methods having peak values higher than a predetermined value $V_{th}$ (the focusing position calculation methods with L=1, 5, 8, in FIG. 4) are selected on the basis of the evaluation value characteristics obtained by the respective focusing position calculation methods in accordance with a program stored in the ROM 32. Thereafter, one of the selected focusing position calculation methods, in which a change $\Delta V_L$ at a depth of focus $V_L$ of the objective lens becomes a maximum value, is selected, as shown in FIG. 5. In the case shown in FIG. 4, the focusing position calculation method with L=8 is selected as the optimal focusing position calculation method and is stored in the RAM 31. Subsequently, an automatic focusing operation is performed by using the optimal focusing position calculation method stored in the RAM 31.

As described above, in this case, the stage is scanned in the Z direction within a predetermined scan range including a focusing position to which the stage is manually adjusted by a user, evaluation values are obtained at the respective positions by different types of focusing position calculation methods, and a focusing position calculation method which provides an optimal focusing position is selected on the basis of these evaluation values. Therefore, a sample can always be positioned stably to an optimal focusing position reflecting the intention of the user with high precision. In an automatic focusing operation, upon selection of the optimal focusing position calculation method, a high-speed operation can be performed by determining both a scan range of the stage ST in the Z direction in consideration of a range where the evaluation value $V_L$ is higher than the predetermined value $V_{th}$ (Za to Zb in FIG. 4), and the influences of sample thickness errors and stage height errors.

FIG. 6 shows a practical example of the first embodiment of the present invention. The arrangement of this example is the same as that shown in FIG. 3 except that a digital signal processor (DSP) 41 as a high-speed arithmetic unit and a memory 42 for the DSP 41 are added. With this arrangement, digital filter processing and fast Fourier transform (FFT) processing can be performed at high speed so as to detect an in-focus state by using the spatial frequency distribution of an as a focusing position calculation method.

Figure 7:
FIGS. 7 and 8 are graphs for explaining an operation of the apparatus in FIG. 6.

An operation of this example will be described below. A CPU 12 determines a scan range of the stage ST in the same manner as described above with reference to FIG. 3. The CPU 12 then causes a stage driving unit 21 to move the stage ST in the scan range, and fetches image information at the respective positions. Thereafter, the CPU 12 causes the DSP 41 to perform FFT processing of the image information. If the image information one-dimensionally includes 512 pixels, one side of the real part of the result of the Fourier transform is expressed by, e.g., the graph shown in FIG. 7.

Figure 8:
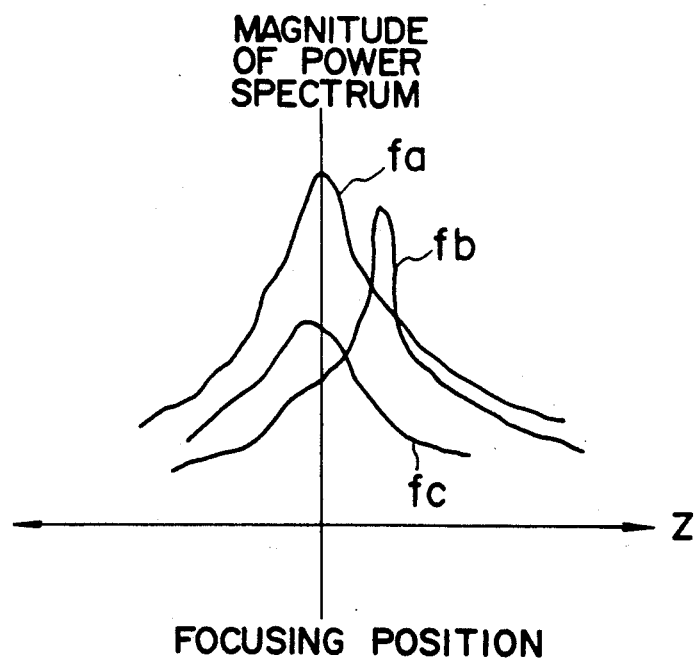

In this case, spatial frequencies at which the magnitude of the power spectrum of a real part obtained by Fourier transform is greatly changed depending on a scan range are, e.g., frequencies $f_a$, $f_b$, and $f_c$, and these frequencies are stored in the DSP memory 42 in advance. With this arrangement, change characteristics of the frequencies $f_a$, $f_b$, and $f_c$ of fetched image information are obtained, as shown in FIG. 8.

The change characteristics of the frequencies $f_a$, $f_b$, and $f_c$ of the image information in the scan range are obtained in the above-described manner. Thereafter, on the basis of the change characteristics, the CPU 12 selects a spatial frequency at which the maximum power spectrum appears near a focusing position to which the stage ST is manually adjusted and high-level Change characteristics can be provided. In the case shown in FIG. 8, focusing position calculation method based on the spatial frequency $f_a$ is selected as an optimal focusing position calculation method and is stored in the DSP memory 42. Subsequently, a digital band-pass filter having the frequency $f_a$ as a center frequency is formed by the DSP 41 in accordance with the optimal focusing position calculation method stored in the DSP memory 42, and input image information is filtered by this band-pass filter, thus performing an automatic focusing operation while evaluating a focusing degree.

According to this example, the stage is scanned in the Z direction within a predetermined scan range including a focusing position to which the stage is manually adjusted by a user, and the power spectra of different spatial frequencies (focusing position calculation methods) set at the respective positions i advance are obtained. On the basis of changes in power spectra, the CPU selects a spatial frequency (optimal focusing position calculation method) which provides an optimal focusing position. Therefore, a focusing degree can be evaluated with high precision on the basis of image information obtained by performing optimal filter processing of a sample. As a result, the stage can always be positioned stably to the optimal focusing position reflecting the intention of the user with high precision. In addition, by selecting an optimal spatial frequency upon initialization, optimization of a filter, which is difficult to perform in real time even with the DSP 41, can be performed.

FIG. 9 shows still another practical example of the first embodiment of the present invention. In this example, an image processor 46 and a computer 47 are added to an automatic focusing apparatus 45 having the arrangement shown in FIG. 3. With this arrangement, since an optimal focusing position calculation method can be selected by using the memory and arithmetic functions of the image processor 46 and the computer 47, the operation capacity and memory size of the automatic focusing apparatus 45 can be reduced, thus realizing a reduction in cost and size of the apparatus. In the arrangements shown in FIGS. 3 and 6, a focusing position calculation method which provides an optimal focusing position can be selected from complicated focusing position calculation methods and from a larger number of the same type or different types of focusing position detecting methods.

The first embodiment of the present invention is not limited to the examples described in above, but various changes and modifications can be made. For example, in the above examples, the image input section 11 comprises a solid imaging element, such as a CCD, but may comprise by a general TV camera. In addition, in the above-described examples, the stage position detector 25 such as an encoder is arranged to detect the position of the stage ST in the Z direction. If, however, a stepping motor is used as the stage driving unit 21, position data of the stage may be obtained by counting driving pulses for the stepping motor by means of the CPU 12. Furthermore, adjustment of the relative distance between a sample and an objective optical system is not limited to the movement of the stage ST in the Z direction but may be performed by moving the objective optical system in the Z direction.

In the arrangement shown in FIG. 3, the four types of focusing position calculation methods based on the contrast evaluation function L in the above equations, which are obtained for L=1, 5, 8, 10, are used. However, the present invention is not limited to the four types, but three or less types of calculation methods may be selected. If the capacity of the ROM 32 is large, a larger number of calculation methods may be stored, and an optimal method can be selected therefrom. If a method is selected from a larger number of calculation methods in this manner, further optimization can be expected.

In addition to selection of a focusing position calculation method which provides an optimal focusing position, a plurality of focusing position calculation methods may be properly combined to be used as an optimal focusing position calculation method. For example, in addition to the above-described contrast me&hod, a technique is available in which a luminance histogram is obtained to obtain its variances, and a focusing position is calculated from the obtained variances. One of the evaluation value characteristics obtained by the contrast method and one of the evaluation value characteristics obtained from the luminance histogram can be combined and added together, and focusing control can be performed by an optimal focusing position calculation method using both of the characteristics.

When a relatively thick sample, for which a stable operation is difficult to perform by using a general focusing technique, is to be observed, the $V_L$ characteristics shown in FIG. 10 may appear. In such a case, $dV_L/dz$ is calculated to obtain the $dV_L/dz$ characteristic curves shown in FIG. 11, and a curve having one zerocrossing point may be selected as a curve for an optimal focusing position calculation method. In this case, if the peak of the selected $V_L$ characteristic curve is deviated from the focusing position, a corresponding offset value must be set in advance. Note that if there is no characteristic curve having one zero-crossing point, and the $V_L$ characteristic curves respectively have a plurality of peaks, a peak is selected.

In addition, a plurality of samples may be used, and an optimal focusing position calculation method is selected in consideration of the average and variances of pieces of data obtained from these samples. With this operation, a more reliable optimal focusing position calculation method can be selected.

Furthermore, assume that a focusing operation is required with respect to a specific pattern of a sample. In this case, by adding conditions, e.g., positioning a region including the specific pattern at the center of the field of vision in initialization, a focusing degree can be efficiently evaluated in the initialization.

In the above-described embodiment, the objective optical system L may be driven instead of driving the stage ST by using the stage driving section 4. That is, either of the stage ST or the objective optical system L may be driven as long as they are driven relative to each other in the direction of the optical axis.

The first embodiment of the present invention is not limited to automatic focusing in the optical microscope described above but can be effectively applied to automatic focusing in various types of optical devices.

As described above, according to the first embodiment of the present invention, the optical system and a target object are driven relative to each other within a predetermined relative distance range including the relative distance between the optical system and the target object which are adjusted to a focusing position set by a user, thus detecting evaluation characteristics using a plurality of focusing position calculation methods. On the basis of these evaluation characteristics, a calculation method which provides an optimal focusing position in an automatic focusing operation is selected from a plurality of focusing position calculation methods. With this operation, the target object can always be positioned stably to the optimal focusing position desired by the user with high reproducibility and with high precision.

Moreover, in the application of the first embodiment of the present invention to a microscope, since a microscopic method to be used, a mirror base to be used, a sample, and the like are evaluated at the time of initialization, a substantially optimal focusing position calculation method can be selected. Therefore, high-precision, high-speed automatic focusing can be performed, and an effective focusing operation can be performed with respect to samples which are difficult to process in a conventional technique.

A focusing position detecting apparatus for an automatic focusing apparatus according to the second embodiment of the present invention will be described below with reference to the accompanying drawings.

Figure 12A:
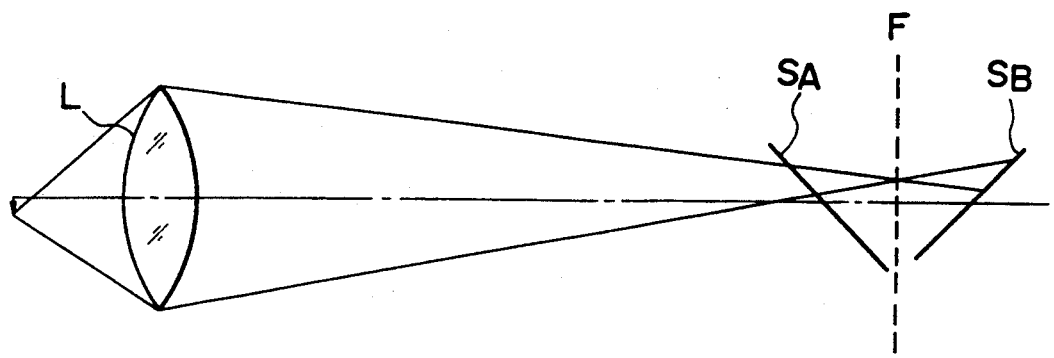
FIGS. 12A and 12B are views for explaining a principle of a focusing position detecting apparatus according to the second embodiment of the present invention.
Figure 12B:
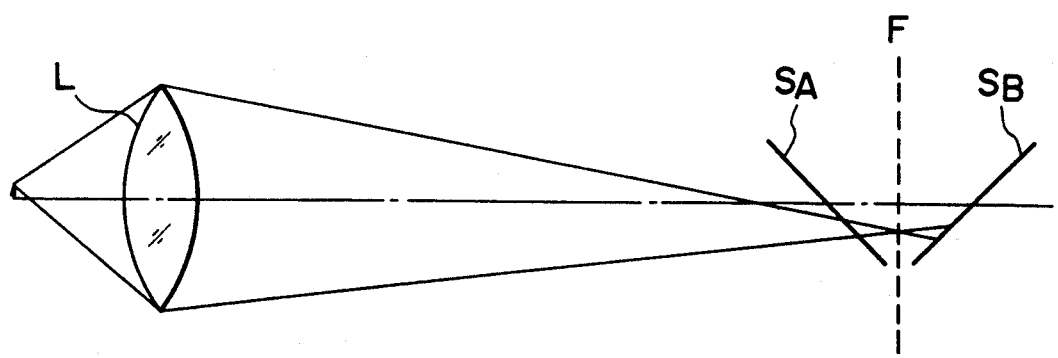

A principle of the focusing position detecting apparatus for the automatic focusing apparatus according to the second embodiment of the present invention will be briefly described first. As shown in FIGS. 12A and 12B, the second embodiment is characterized in that a pair of light-receiving element arrays $S_A$ and $S_B$ are arranged on both sides of an image forming plane or a conjugate focal plane F of an optical system L at positions separated from the focal plane F by predetermined distances in the direction of the optical axis while the light-receiving surfaces of the arrays $S_A$ and $S_B$ are inclined at predetermined angles with respect to the optical axis.

With this arrangement, images based on different optical path lengths are formed in different light-receiving regions on the respective light-receiving planes of the light-receiving element arrays, and hence a plurality of output signals based on the different optical path lengths are obtained from the respective light-receiving regions. These output signals are respectively converted into evaluation values by predetermined evaluation functions, as will be described later. A focusing position is detected on the basis of the evaluation values. In this apparatus, therefore, a plurality of evaluation values based on different optical path lengths can be obtained without using a driving unit for moving the light-receiving element arrays as in a conventional technique, thereby improving the focusing precision.

A practical example based o the above principle will be described below.

FIG. 13 shows an arrangement of a practical example of the focusing position detecting apparatus according to the second embodiment of the present invention. In this example, light transmitted through a focusing lens 51 of an optical system is separated into a transmitted light component and a reflected light component by a half mirror 52. Of these components, the transmitted light component is incident on a two-dimensional CCD array 53 which is arranged in front of a focal plane $F_A$ at a position separated therefrom by a predetermined distance in the direction of the optical axis while the light-receiving surface of the CCD array 53 is inclined at a predetermined angle with respect to the optical axis. The reflected light component reflected by the half mirror 52 is reflected by a total reflection mirror 54 to be incident on a two-dimensional CCD array 55 which is arranged behind a focal plane $F_B$ at a position separated therefrom by a predetermined distance in the direction of the optical axis while the light-receiving surface of the CCD array 55 is inclined at a predetermined angle with respect to the optical axis.

A relationship between the focal planes $F_A$ and $F_B$ and the two-dimensional CCD arrays 53 and 55 will be described in more detail below with reference to FIGS. 14A and 14B.

The two-dimensional CCD arrays 53 and 55 are arranged such that distances $d_A$ and $d_B$ between the focal planes $F_A$ and $F_B$ and intersection points $P_A$ and $P_B$ where the light-receiving planes $S_A$ and $S_B$ of the two-dimensional CCD arrays 53 and 55 and the optical axis intersect are set to be equal to each other. In addition, planes which include the intersection points $P_A$ and $P_B$ and are perpendicular to the optical axis are respectively represented by $F_A'$ and $F_B'$, and intersection lines where the planes $F_A'$ and $F_B'$ and the light-receiving surfaces $S_A$ and $S_B$ intersect are respectively represented by $l_A$ and $l_B$. The two-dimensional CCD arrays 53 and 55 are arranged such that distances $d_A'$ and $d_B'$ between the focal planes $F_A$ and $F_B$ and light-receiving regions $R_A$ and $R_B$ separated from the intersection lines $l_A$ and $l_B$ by the same distance on the light-receiving surfaces $S_A$ and $S_B$ are set to be equal to each other. That is, the two-dimensional CCD arrays 53 and 55 are arranged such that the distances $d_A$ and $d_B$ are equal to each other, and the distances $d_A'$ and $d_B'$ are equal to each other. With this arrangement, substantial identical images are formed on the light-receiving regions $R_A$ and $R_B$ separated from the intersection lines $l_A$ and $l_B$ on the light-receiving surfaces $S_A$ and $S_B$ by the same distance.

Referring back to FIG. 13, signals read from the light-receiving regions $R_A$ and $R_B$ of the two-dimensional CCD array 53 and 55 arranged in the above-described manner are respectively converted into digital signals by A/D converters 57a and 57b through preamplifiers 56a and 56b. Thereafter, the digital signals are input to an arithmetic control section (CPU) 58. The CPU 58 is connected to a magnification detector 59 for detecting the magnification of the optical system so as to receive magnification data therefrom. The CPU 58 has two functions: converting output signals from the light-receiving regions of the two-dimensional CCD arrays 53 and 55 into evaluation values in accordance with predetermined evaluation functions; and selecting a pair of light-receiving regions (arbitrary light-receiving regions having the same optical length) $R_A$ and $R_B$, on each of which a predetermined image is formed, from a plurality of light-receiving regions having different optical path lengths, calculating a defocus amount from the evaluation values of the light-receiving regions $R_A$ and $R_B$ and corresponding magnification data, and generating a lens driving signal on the basis of the calculation result. Upon reception of the lens driving signal from the CPU 58, a lens driving unit 60 moves the focusing lens 51 to a focusing position. In addition, the CPU 58 supplies commands to timing circuits 61a and 61b to drive the two-dimensional CCD arrays 53 and 55 in a predetermined time sequence. Timing signals output from these timing circuits 61a and 61b are respectively supplied to the two-dimensional CCD arrays 53 and 55 through imaging element drivers 62a and 62b. With this operation, stored charges are read from the two-dimensional CCD arrays 53 and 55 as image signals, respectively.

An operation of this example having the above-described arrangement will be described below.

In this example, as shown in FIG. 14A and 14B, the two-dimensional CCD arrays 53 and 55 are arranged such that the distances $d_A$ and $d_B$, and the distances $d_A'$ and $d_B'$ are respectively set to be equal to each other, and the light-receiving surfaces $S_A$ and $S_B$ are inclined at the predetermined angles with respect to the optical axis, respectively. Therefore, substantially identical out-of-focus images are formed on the light-receiving surfaces of the two-dimensional CCD arrays 53 and 55 at the time of focusing. As a result, images based on different optical path lengths from the focal planes are formed in the respective light-receiving regions of the light-receiving surfaces $S_A$ and $S_B$, while identical images are formed on the light-receiving regions $R_A$ and $R_B$ whose optical path lengths from the light-receiving surfaces $S_A$ and $S_B$ to the focal planes are the same. The two-dimensional CCD arrays 53 and 55 on which such images are formed are driven by the imaging element drivers 62a and 62b so that charges are read from the respective light-receiving regions $R_A$ and $R_B$.

Figure 15A:
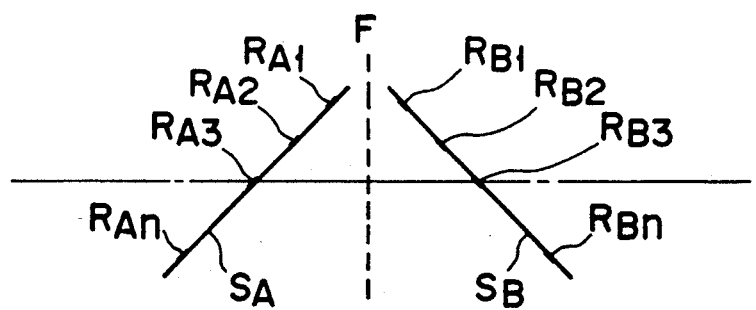
FIG. 15A is a view showing optical path lengths from the focal plane to the respective light reception regions in the two-dimensional CCD arrays in FIG. 13.
Figure 15B:
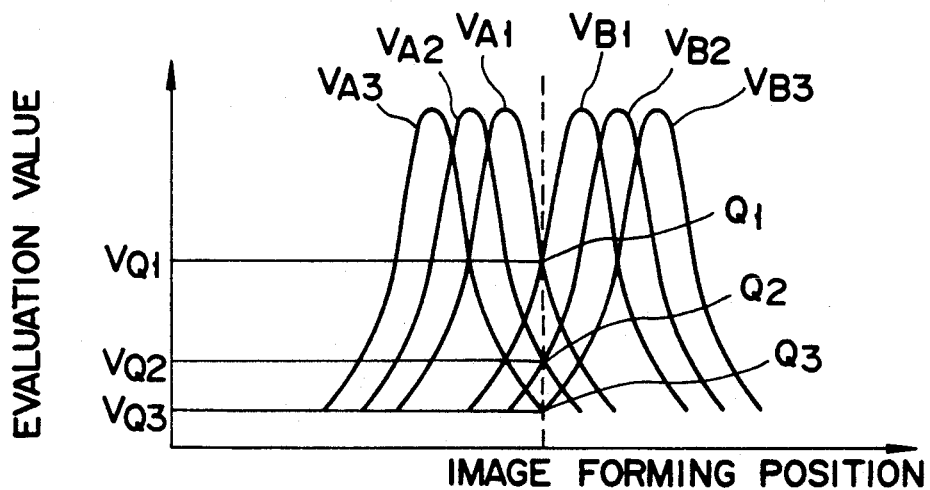
FIGS. 15B and 15C are graphs for explaining an operation of the apparatus in FIG. 13.
Figure 15C:
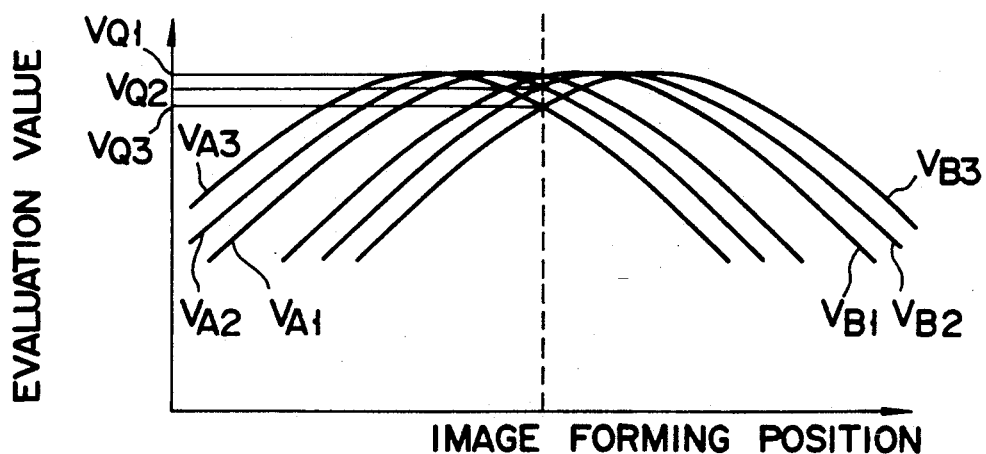

As shown in FIG. 15A, if pairs of light-receiving regions respectively having the same optical path lengths from the focal planes $F_A$ and $F_B$ are respectively represented by $(R_{A1}, R_{B1})$, $(R_{A2}, R_{B2})$, ... $(R_{An}, R_{Bn})$, and evaluation values based on output signals from the respective pairs of light-receiving regions are respectively represented by $(V_{A1}, V_{B1})$, $(V_{A2}, V_{B2})$, ... $(V_{An}, V_{Bn})$, relationships between the evaluation values $(V_{A1}, V_{B1})$, $(V_{A2}, V_{B2})$, ... $(V_{An}, V_{Bn})$ and the image forming positions are obtained, as shown in FIGS. 15B and 15C. Note that FIG. 15B shows evaluation values at a low magnification; and FIG. 15C, evaluation values at a high magnification.

The CPU 58 converts output signals from the two-dimensional CCD arrays 53 and 55 into the evaluation values $(V_{A1}, V_{B1})$, $(V_{A2}, V_{B2})$, ... $(V_{An}, V_{Bn})$, and evaluation values $V_{Q1}, V_{Q2}, \ldots V_{Qn}$ at points $Q_1, Q_2, \ldots Q_n$ at which the evaluation values of the respective pairs are respectively set to be equal to each other are obtained. Of these evaluation values $V_{Q1}, V_{Q2}, \ldots V_{Qn}$, evaluation values $V_{Am}$ and $V_{Bm}$ which satisfy $VL < V_{Qm} < V_H$ are selected and extracted, and a position at which a difference $\Delta V = V_A - V_B$ becomes 0 is detected as a focusing position. In this case, $V_L$ and $V_H$ are values for setting the lower and upper limits of evaluation values. If the value $V_{Qm}$ is excessively large, the difference between the values $V_L$ and $V_H$ becomes undesirably small. If the value $V_{Qm}$ is excessively small, detection is difficult to perform. Therefore, these values are set in a range in which no deterioration in focusing precision occurs.

More specifically, as shown in FIG. 15B, if a low-magnification objective lens is used, the depth of focus on the image side is small, and change amounts of the evaluation values $V_A$ and $V_B$ in the direction of the optical axis are increased. For this reason, a value $V_{Q3}$ is very small when a difference $\Delta V_3$ between evaluation values $(V_{Al}, V_{Bl})$ based on output signals from light-receiving regions $(R_{Al}, R_{Bl})$, i.e., $\Delta V_3 = V_{A3} - V_{B3}$, becomes 0. This makes it difficult to detect the value $V_{Q3}$. In this example, therefore, the small values $V_{A3}$ and $V_{B3}$ are cut by the lower limit value $V_L$, and evaluation values $(V_{Al}, V_{Bl})$ based on output signals from light-receiving regions $(R_{Al}, R_{Bl})$ are selected such that the evaluation value difference $\Delta V$ is sufficiently large compared with the value $V_{Q3}$. Since the value $V_{Q1}$ at which the difference between the selected values $V_{Al}$ and $V_{Bl}$ becomes 0 is sufficiently large compared with the value $V_{Q3}$, the value $V_{Q1}$ can be easily detected. In addition, since a gradient is large when a difference $\Delta V_1$ ($= V_{A1} - V_{B1}$) is large, the focusing precision is improved.

As shown in FIG. 15C, if a high-magnification objective lens is used, the depth of focus on the image side is large, and changes in evaluation values $V_A$ and $V_B$ in the direction of the optical axis are reduced. For this reason, a difference $\Delta V_1$ between evaluation values $V_{A1}$ and $V_{B1}$ based on output signals from the light-receiving regions $R_{A1}$ and $R_{B1}$, i.e., $\Delta V_1 = V_{A1} - V_{B1}$, is small. In addition, since a value $V_{Q1}$ of $(V_{A1}, V_{B1})$ becomes substantially equal to a peak value when $\Delta V_1 = 0$, the gradient of $\Delta V$ is reduced, and focusing position detection is difficult to perform. In this example, therefore, evaluation values like the evaluation values $V_{A1}$ and $V_{B1}$ which reduce the gradient of $\Delta V$ to make focusing position detection difficult are cut by the upper limit value $V_H$. With this operation, the evaluation values $(V_{A3}, V_{B1})$ based on output signals from the light-receiving regions $(R_{A3}, R_{B1})$ are selected such that $\Delta V$ has a sufficient gradient.

In this example, in order to obtain out-of-focus image information based on an optical path difference which varies depending on a magnification, the CPU 58 selectively uses output signals from the two-dimensional CCD arrays 53 and 55 on the basis of magnification data obtained by the magnification detector 59, thus detecting the focusing position of the optical system in accordance with evaluation values such as contrast values. Thereafter, a distance and direction to a focusing position detected from the current position of the optical system are calculated. A driving signal is generated by the calculation result and is output to the lens driving unit 60.

As described above, according to this example, since the two-dimensional CCD arrays 53 and 55 are arranged such that the distances $d_A$ and $d_B$ from the focal planes $F_A$ and $F_B$ to the light-receiving surfaces $S_A$ and $S_B$, and the distances $d_A'$ and $d_B'$ from the focal planes $F_A$ and $F_B$ to the light-receiving regions $R_A$ and $R_B$ are respectively set to be equal to each other, and the light-receiving surfaces $S_A$ and $S_B$ are inclined at predetermined angles with respect to the optical axis, image information based on a plurality of different optical path lengths, i.e., a plurality of evaluation values, can be obtained without using a moving unit for mechanically moving the two-dimensional CCD arrays 53 and 55, thereby simplifying the arrangement of the apparatus and allowing high-precision focusing adjustment.

In addition, a range of evaluation values which allows proper focusing position detection is set, and an evaluation value which facilitates detection and provides a sufficient gradient is selected from the range in accordance with the magnification of the optical system. Therefore, even if the magnification of the optical system is changed, high-precision focusing adjustment can always be performed, thus greatly improving the reliability of the apparatus.

In the example described with reference to FIG. 13, after output signals from the two-dimensional CCD arrays 53 and 55 are converted into digital signals by the A/D converters 57a and 57b, evaluation functions are calculated. However, evaluation functions may be calculated on the basis of analog signals.

Another practical example of the second embodiment of the present invention will be described below.

A hardware arrangement of this example is the same as that of the apparatus shown in FIG. 13 and is characterized in a method of processing pieces of image information, based on a plurality of optical path lengths, which are simultaneously obtained.

In this example, sum signals $$\sum_{i=m}^{n} V_{Ai} \text{ and } \sum_{i=m}^{n} V_{Bi}$$

obtained on the basis of pairs of evaluation values from light-receiving regions having larger optical path lengths than the light-receiving regions $R_{Am}$ and $R_{Bm}$, which have optimal optical path lengths selectively used for each magnification in the first example, are used as evaluation values for a focusing position detecting operation.

Figure 16A:
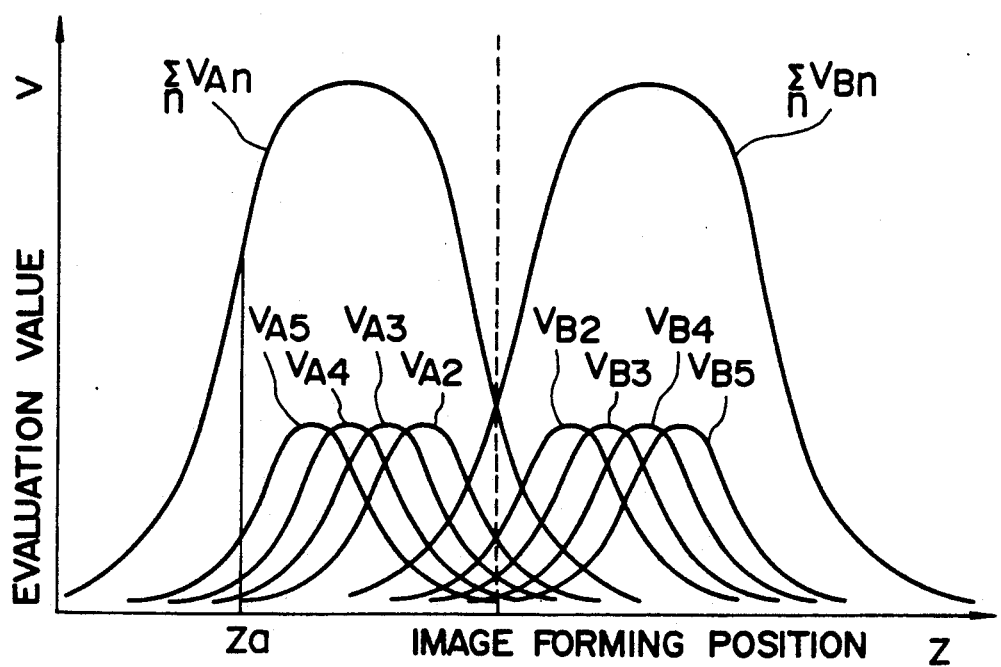
FIGS. 16A and 16B are graphs for explaining an operation, in another form, of the second embodiment of the present invention.

FIG. 16A shows evaluation values $V_{An}$ and $V_{Bn}$ based on output signals from light-receiving regions $R_{An}$ and $R_{Bm}$ having different optical path lengths from the focal planes of a pair of light-receiving surfaces $S_A$ and $S_B$ at a given magnification of the optical system, and sums $$\sum_n V_{An} \text{ and } \sum_n V_{Bn}$$

based on the evaluation values $V_{An}$ and $V_{Bn}$. Referring to FIG. 16A, a pair of light-receiving regions having optimal optical path lengths selectively used for a predetermined magnification are $R_{A2}$ and $R_{B2}$, and $n \geq 2$.

Figure 16B:
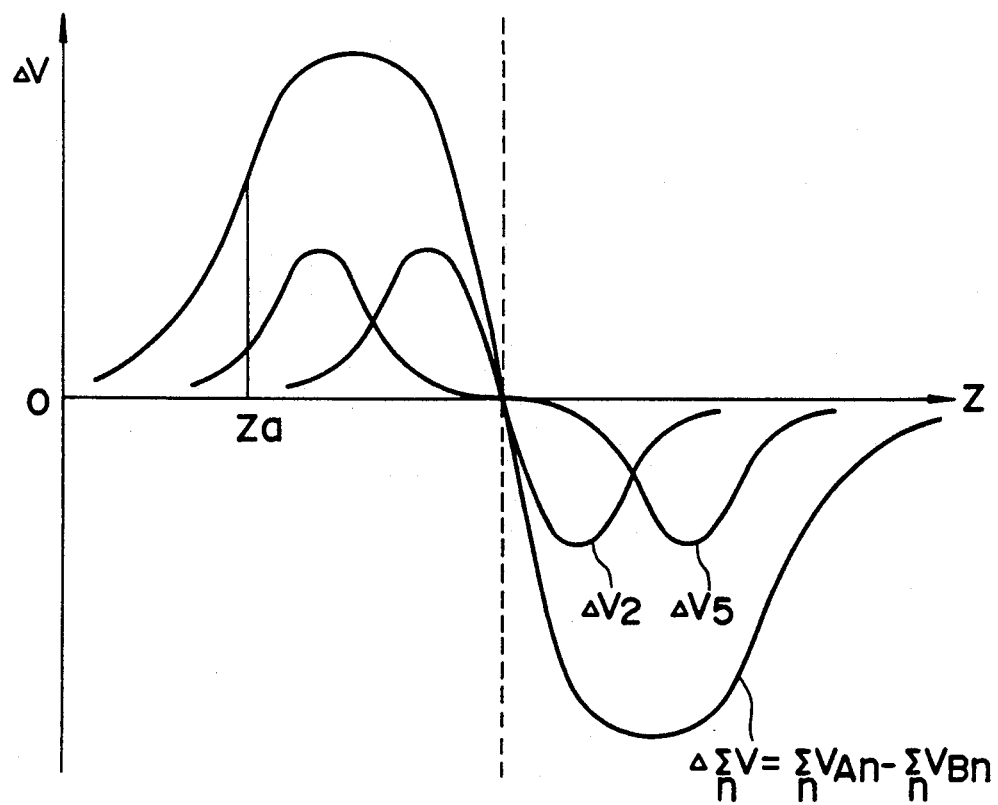
Figure 23:
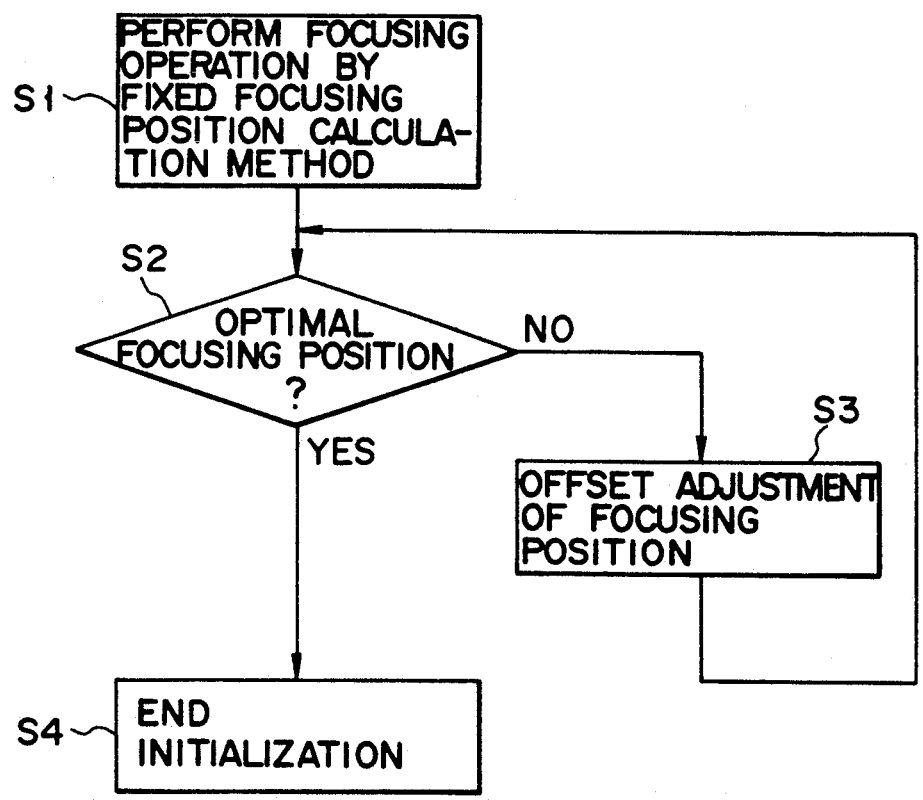
FIG. 23 is a flow chart for explaining a conventional automatic focusing technique.
Figure 24A:
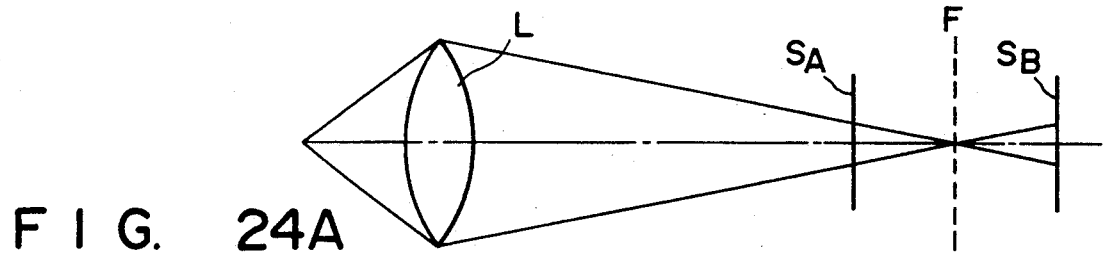
FIGS. 24A, 24B, and 24C and 25A, 25B, 25C, and 25D are views for explaining a conventional focusing position detecting technique.
Figure 24B:
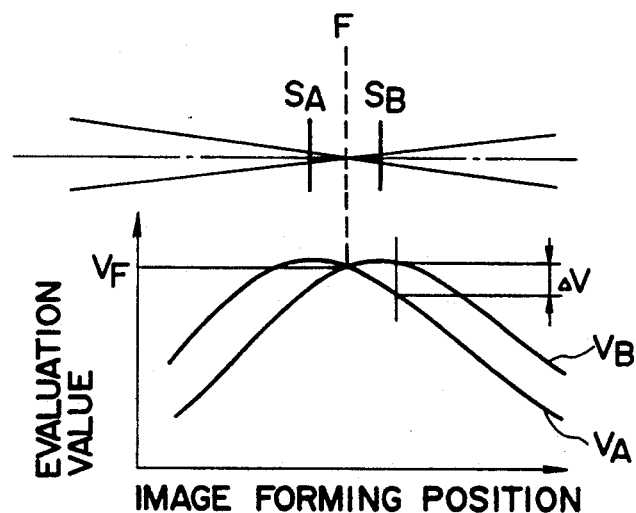
Figure 24C:
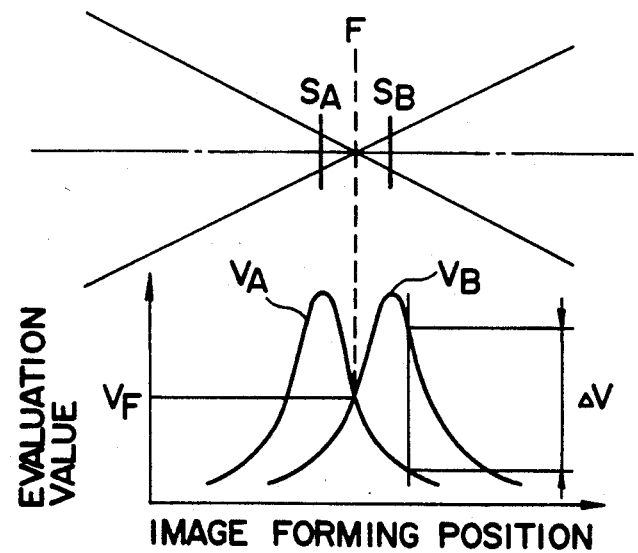
Figure 25A:
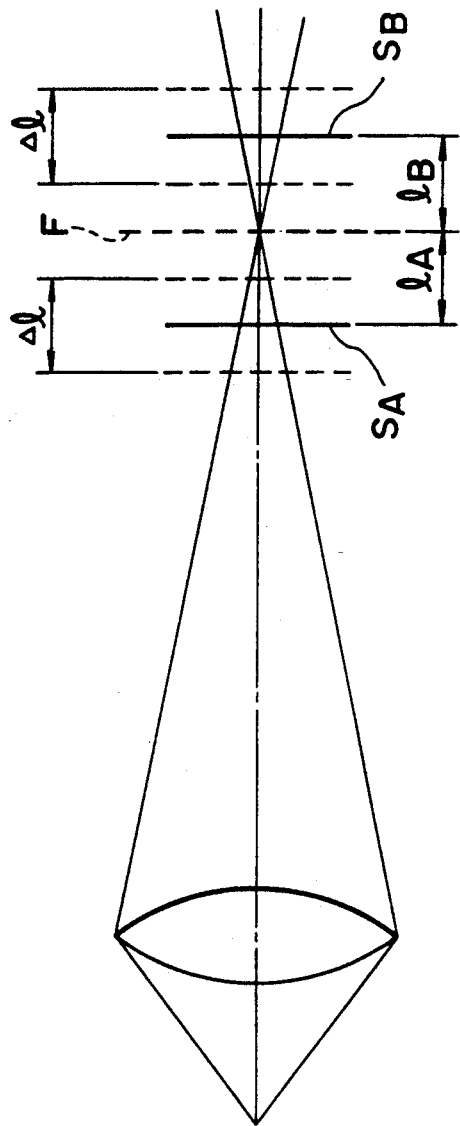
Figure 25B:
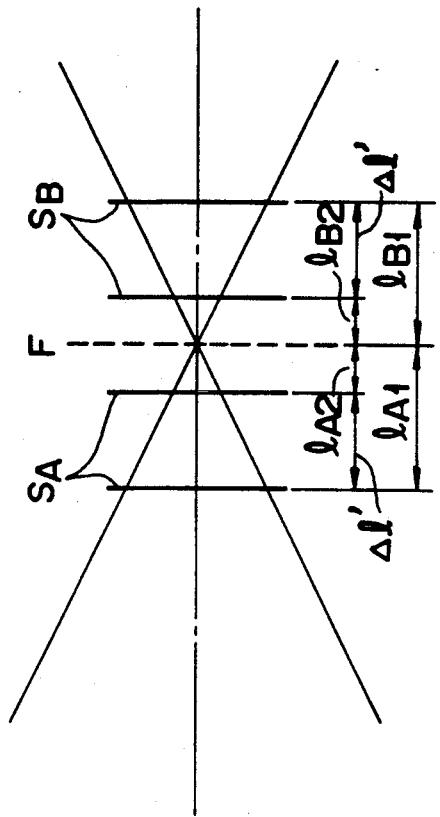
Figures 25C, 25D:
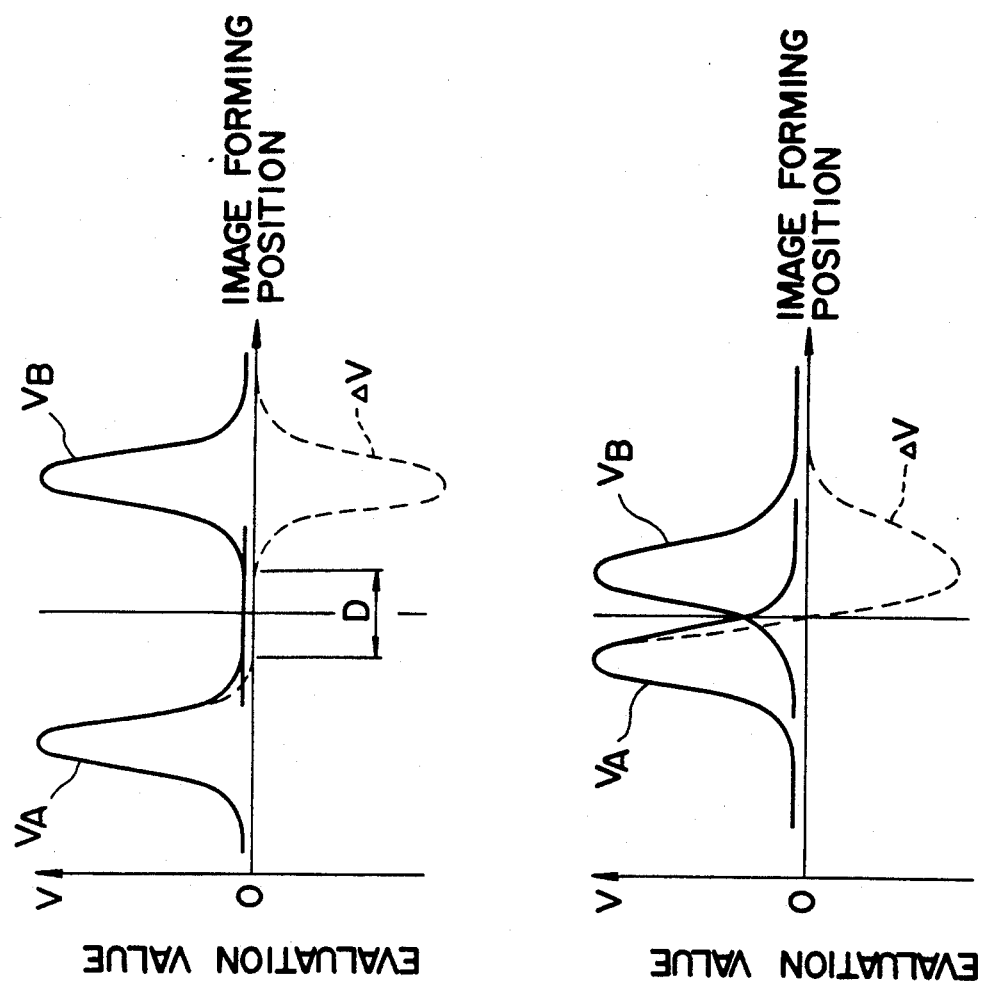
Figure 26:
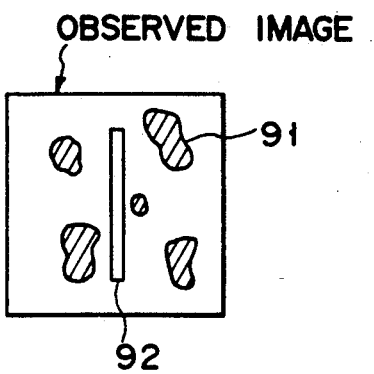
FIG. 26 is a view showing a relationship between a sample image and a scanning region in a conventional technique and FIG. 27 is a block diagram showing a schematic arrangement of a conventional focusing position detecting apparatus.
Figure 27:
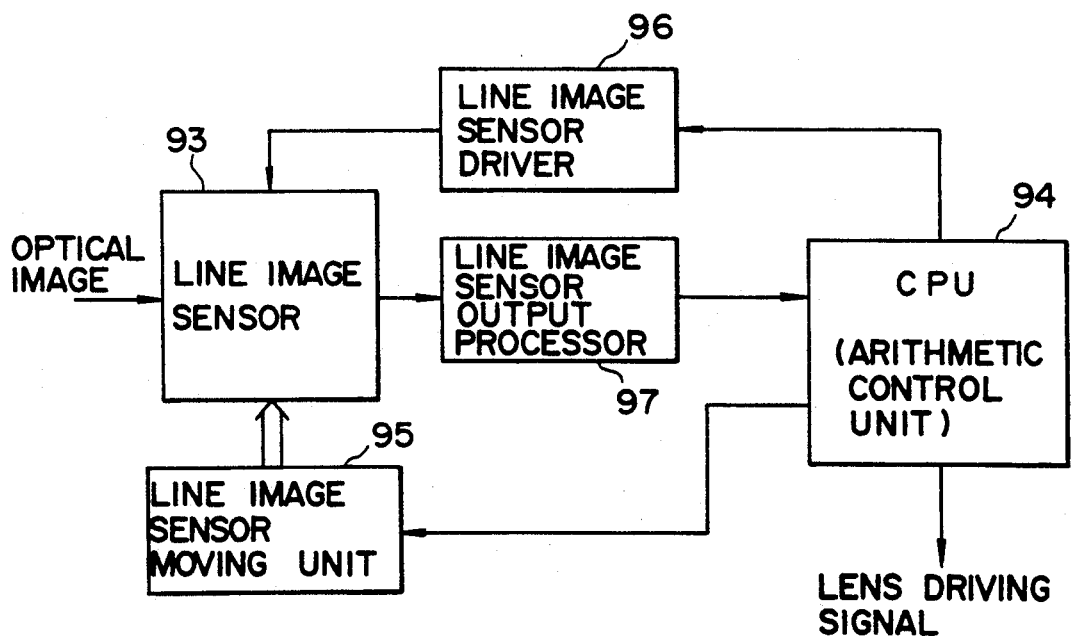

Assume that the position of a real image on the optical axis is represented by Za when evaluation values shown in FIG. 16A are obtained. In this case, if the evaluation values $V_{A2}$ and $V_{B2}$ based on the optimal optical path lengths in the first example are used, since the level of an evaluation value at the position Za is excessively small, a focusing position cannot be detected, i.e., a corresponding region falls outside a so-called capture range. In addition, if evaluation values $V_{A5}$ and $V_{B5}$ based on output signals from light-receiving regions $R_{A5}$ and $R_{B5}$ having larger optical path lengths from the focal planes than the light-receiving regions $R_{A2}$ and $R_{B2}$ are used, the level of an evaluation value at the position Za is sufficiently increased. However, as shown in FIG. 16B, since the gradient of an evaluation value difference $\Delta V_5$ near the focusing position where the difference $\Delta V_5 = V_{A5} - V_{B5}$ becomes 0 is small, high-precision focusing position detection cannot be performed.

In the second example, therefore, evaluation values based on output signals from light-receiving regions having larger optical path lengths from the focal planes than the light-receiving regions $R_{A2}$ and $R_{B2}$ are added together to obtain sums $\Sigma V_{An}$ and $\Sigma V_{Bn}$ as evaluation functions. If the sums of evaluation values based on output signals from light-receiving regions having optical path lengths larger than optimal optical path lengths are used as evaluation functions, a sufficient evaluation level as the position Za can be ensured as shown in FIG. 16A, and at the same time, an evaluation function $$\Delta \sum_n V_n = \sum_n V_{An} - \sum_n V_{Bn}$$

near the focusing position has a large gradient, thus widening the capture range.

As described above, according to the second example, since the sums of evaluation values based on output signals from light-receiving regions having optical path lengths from the focal planes larger than optimal optical path lengths are used as evaluation functions, the capture range can be widened, and focusing position detection can be performed with higher precision.

As described in detail above, according to the second embodiment of the present invention, there is provided a focusing position detecting apparatus for an automatic focusing apparatus which has a simple arrangement, and can properly detect a focusing position regardless of changes in magnification of the optical system, thereby realizing a high-precision focusing position detecting operation.

The third embodiment of the present invention will be described below with reference to the accompanying drawings.

FIG. 17 shows a schematic arrangement of a first practical example of a focusing position detecting apparatus for an automatic focusing apparatus according to the third embodiment of the present invention. The apparatus of this example comprises an imaging lens 71 for forming a sample image 70 obtained by an optical system (not shown) such as an optical microscope, a unidirectionally compressing image forming optical system 72 for compressing the two-dimensional image formed by the imaging lens 71 in a direction indicated by an arrow Y perpendicular to the optical axis, a line image sensor 73 comprising light-receiving elements arranged at an image forming position at which a image line is formed by the optical system 72, and an arithmetic control unit (CPU) 74 which has a focusing position detecting/calculating function based on, e.g., a plurality of evaluation values, and receives scanning signals output from the line image sensor 73.

Note that the CPU 74 is designed to supply a driving signal to the line image sensor 73 to perform a scanning operation, and to supply a lens driving signal to control the imaging lens 71 in the direction of the optical axis so as to obtain an optimal focusing result.

The compressing image forming optical system 72 comprises a cylindrical convex lens 75 and a cylindrical concave lens 76.

An operation of the first practical example having the above-described arrangement will be described below.

Assume that a focusing position detecting operation is to be performed with respect to an object image in which sample components are dispersed as indicated by a left-hand portion in FIG. 18.

In this case, a two-dimensional image of a sample image 70 transmitted through the imaging lens 7 is compressed in a direction indicated by an arrow Y by the unidirectionally compressing image forming optical system 72 to form an image line on the light-receiving elements of the line image sensor 73. Since the image line formed on the light-receiving elements of the line image sensor 73 at this time is obtained by compressing the two-dimensional image of the sample image 70 into a line in the Y direction as indicated by a right-hand portion in FIG. 18, it always includes image information of the sample components, as indicated by hatched lines in FIG. 18. The image line including such image information is scanned by the line image sensor 73 and is input to the CPU 74 as a scanning signal. The CPU 74 performs arithmetic processing for the scanning signal including the image information for focusing position detection, and controls the imaging lens 71 to obtain an optimal focusing result, thus detecting a focusing position. This arithmetic processing can be performed on the basis of a plurality of evaluation values, as in the first and second embodiments.

As described above, according to this example, a two-dimensional image of the sample image 70 is converted into a one-dimensional image by the unidirectionally compressing image forming optical system 72 to allow the image line to include image information, and a scanning signal obtained by scanning the image line by using the line image sensor 73 is fetched in the arithmetic control unit 74 to detect a focusing position. Therefore, a scanning line always includes image information, and image information for focusing position detection can be obtained by one scanning operation. That is, the number of times of movement of the line image sensor 73 can be substantially decreased to 0, and the arithmetic processing amount can be greatly reduced, thus detecting a focusing position at a very high speed.

In addition, since the line image sensor 73 is fixed to the position where an image line is formed, an image sensor moving unit used in a conventional focusing position detecting apparatus is not required. This simplifies the arrangement of the apparatus and allows a reduction in size and cost of the apparatus.

In the example shown in FIG. 17, the unidirectionally compressing image forming optical system 72 comprises the cylindrical convex and concave lens 75 and 76. However, as shown in FIG. 19, the optical system 72 may be comprised of a cylindrical concave mirror 81 and a cylindrical concave lens 82. Note that reference numeral 83 in FIG. 19 denotes a plane mirror for causing a two-dimensional sample image to be incident on the cylindrical concave mirror 81.

Another practical example of the third embodiment of the present invention will be described below.

In this example, as shown in FIG. 20, a unidirectionally compressing image forming optical system 72 and a non-compressing image forming optical system 84, both having the same image forming position, are arranged to be movable in a direction (indicated by an arrow in FIG. 20) perpendicular to the optical axis. An image sensor 85 is arranged at the image forming position of the unidirectionally compressing image forming optical system 72 and the non-compressing image forming optical system 84. A scanning signal output from the image sensor 85 is input to an arithmetic control unit (CPU) 86. The CPU 86 performs operations in accordance with the flow chart shown in FIG. 22. In response to a command from the CPU 86, an image forming optical system switching circuit 87 switches the optical systems 72 and 84 and moves one of them to the position of the optical axis.

Assume that an observed image or an object image is a patterned image, as shown in FIG. 21. In this case, if the two-dimensional image is compressed into a linear image, the contrast of the image may be deteriorated. Therefore, when the image shown in FIG. 21 is to be processed, an image formed by the non-compressing image forming optical system 84 is scanned.

An operation of the second practical example having the above-described arrangement will be described below with reference to FIG. 21.

Assume that a focusing position detection operation is performed with respect to an image to be observed by means of a microscope. In this case, if there is a change in observed image (step S21), the type and contrast data of a new observed image are read (step S22). Either the unidirectionally compressing image forming optical system 72 or the non-compressing image forming optical system 84 is selected in accordance with the read data (step S23). More specifically, if sample components of an observed image are dispersed as indicated by the left-hand portion in FIG. 18, the unidirectionally compressing image forming optical system 72 is selected. If an observed image is patterned as shown in FIG. 21, the non-compressing image forming optical system 84 is selected.

If the image forming optical system currently placed on the position of the optical axis is different from the selected image forming optical system, the CPU 86 supplies a command to the image forming optical system switching circuit 87 to set the selected image forming optical system 73 or 84 to the position of the optical axis (steps S24 and S25). The image formed on the image sensor 85 is scanned, and the scanning signal is fetched in the CPU 86. The CPU 86 then executes arithmetic processing for detecting a focusing position on the basis of the image information included in the scanning signal, thus calculating a focusing position in the same manner as described with reference to FIG. 17 (step S26). This arithmetic processing may be performed on the basis of a plurality of evaluation values, as in the first and second embodiments.

According to the second example described above, the same effect as that of the first example can be obtained. In addition, since the unidirectionally compressing image forming optical system 72 and the noncompressing image forming optical system 84 can be switched from each other in accordance with a sample image, an image suitable for focusing position detection can always be formed on the image sensor 85. Therefore, highly reliable focusing position detection can always be performed.

In the second example, switching of the image forming optical systems is automatically performed. However, an operator may manually switch the image forming optical systems (72, 84).

In the third embodiment of the present invention, a two-dimensional sample image is compressed into a linear image in one direction perpendicular to the optical axis and is formed on the image sensor by means of the compressing image forming optical system in the above-described manner. Since a sample image is compressed in one direction, even if the two-dimensional image is based on dispersed sample components, the image line formed on the image sensor reliably includes image information. Therefore, if arithmetic processing is performed by inputting a scanning signal, obtained by scanning such an image, to an arithmetic control section, a focusing position can be detected by one input operation of image information.

In addition, the compressing image forming optical system having the above-described function and the noncompressing image forming optical system can be switched from each other in accordance with observed image conditions. Therefore, if sample components are dispersed, an image line formed by the compressing image forming optical system is scanned. In contrast to this, if image compression leads to a deterioration in image information, an image formed by the non-compressing image forming optical system is scanned. With this operation, an image suitable for focusing position detection can always be formed.

As has been described in detail above, according to the third embodiment of the present invention, there is provided a focusing position detecting apparatus for an automatic focusing apparatus which has a simple, compact arrangement and can greatly increase the focusing position detecting speed.

Furthermore, there is provided a focusing position detecting apparatus for an automatic focusing apparatus which can form an image suitable for focusing position detection on an image sensor in accordance with a sample image, and can always perform highly reliable focusing position detecting operation.

Additional embodiments of the present invention will be apparent to those skilled in the art from consideration of the specification and practice of the present invention disclosed therein. It is intended that the specification and examples be considered as exemplary only, with the true scope of the present invention being indicated by the following claims.

We claim:

1. An automatic focusing apparatus comprising:

driving means for moving an object to be focused and an objective optical system relative to each other in a direction of an optical axis of the objective optical system;

information detecting means for detecting information of the object, obtained by the objective optical system;

memory means for previously storing data of a plurality of different focusing position calculating methods, each focusing position calculation method being for use in observation of objects of similar types;

initialization starting means for starting an initialization operation after a user manually detects an optimum focusing position for an object selected from objects of similar types to be focused by moving the selected object and the objective optical system relative to each other;

first initialization means for supplying an instruction indicating a start of a scanning operation to said driving means, the scanning operation being performed in a stepwise manner within a predetermined range including the optimum focusing position detected by the user in response to operation of said initialization starting means;

initial data fetching means for fetching a plurality of results obtained by performing the plurality of different focusing position calculation methods using the data stored in said memory means and according to information on an selected object which is selected during scanning by said driving means according to the instruction supplied by said first initialization means;

second initialization means for selecting an optimum focusing position calculation method from the plurality of focusing position calculation methods for a focusing operation in accordance with the plurality of results fetched by said initial data fetching means; and control means for performing the optimum focusing position calculation method and for detecting a focusing position corresponding to objects other than the selected objects from among the objects of similar types by controlling said driving means in accordance with a result obtained by performing the optimum focusing position calculating method.

2. An apparatus according to claim 1, wherein differences of the plurality of focusing position calculation methods comprise spatial sampling pitches to an image information of said object.

3. An apparatus according to claim 1, wherein the plurality of focusing position calculation methods detect in-focus states by using spatial frequency distributions of the information, the spatial frequency distributions being obtained by fundamental calculation methods for processing the information after filtering by spatial frequency filters, and differences of the plurality of focusing position calculation methods comprise band widths of the spatial frequency filters.

4. An apparatus according to claim 1, wherein the plurality of focusing position calculation methods comprise constructed fundamental calculation methods and correcting methods which correct calculation values of the fundamental calculation methods, and differences of the plurality of focusing position calculation methods comprise the correcting methods or correcting amounts of the correcting methods.

5. An automatic focusing apparatus according to claim 1, further comprising:

means for performing an arithmetic operation according to a specified standard focusing position calculation method when a focusing position detecting operation is performed for objects of different types; and means for selecting a focusing position calculation method which is optimum for the objects of similar types by operating said first and second initialization means when the objects of similar types are detected.

* * * * *